(12) United States Patent
Shinano et al.

(10) Patent No.: US 8,456,755 B2
(45) Date of Patent: Jun. 4, 2013

(54) LENS BARREL

(75) Inventors: Fumio Shinano, Osaka (JP); Tetsuya Uno, Osaka (JP); Norihiko Saka, Osaka (JP); Kazuaki Matsui, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/526,182

(22) Filed: Jun. 18, 2012

(65) Prior Publication Data

US 2012/0307380 A1 Dec. 6, 2012

Related U.S. Application Data

(63) Continuation of application No. 12/864,138, filed as application No. PCT/JP2009/000274 on Jan. 23, 2009, now Pat. No. 8,223,441.

(30) Foreign Application Priority Data

Jan. 25, 2008 (JP) ................................. 2008-015370
Feb. 8, 2008 (JP) ................................. 2008-028787
Feb. 8, 2008 (JP) ................................. 2008-028788

(51) Int. Cl.
*G02B 15/14* (2006.01)
(52) U.S. Cl.
USPC ........................................................ 359/700
(58) Field of Classification Search
USPC ........................................................ 359/700
See application file for complete search history.

(56) References Cited

U.S. PATENT DOCUMENTS

| 4,322,151 | A | * | 3/1982 | Weiss ............................. 396/72 |
| 6,369,962 | B1 | | 4/2002 | Nomura et al. |
| 2001/0026401 | A1 | | 10/2001 | Koiwai et al. |
| 2004/0228006 | A1 | | 11/2004 | Yasutomi et al. |
| 2006/0066960 | A1 | | 3/2006 | Nagae |
| 2007/0003273 | A1 | | 1/2007 | Yasuda |
| 2008/0007847 | A1 | | 1/2008 | Koyama |

FOREIGN PATENT DOCUMENTS

| JP | 06-051178 | 2/1994 |
| JP | 8-254644 | 10/1996 |
| JP | 2001-124972 | 5/2001 |
| JP | 2001-281516 | 10/2001 |
| JP | 2003-222777 | 8/2003 |
| JP | 2003-255213 | 9/2003 |
| JP | 2003-315660 | 11/2003 |
| JP | 2005-308852 | 11/2005 |
| JP | 2006-98519 | 4/2006 |
| JP | 2007-041577 | 2/2007 |
| JP | 2007-316386 | 12/2007 |
| JP | 2007-333764 | 12/2007 |
| JP | 2008-255213 | 10/2008 |

* cited by examiner

*Primary Examiner* — Joseph P Martinez
(74) *Attorney, Agent, or Firm* — Hamre, Schumann, Mueller & Larson, P.C.

(57) ABSTRACT

A lens barrel includes a fixing frame provided with cam grooves formed in an inner circumferential surface of the fixing frame, and a drive frame provided with cam followers formed on an outer circumferential surface of the drive frame and a plurality of engaging teeth to the outer circumferential surface of the drive frame, located on substantially the same circumference as the cam followers. With the drive frame incorporated in the fixing frame, the cam followers are fitted in the cam grooves, drive force is transmitted via the engaging teeth, and the drive frame can move relative to the fixing frame in the optical axis direction of a lens as the cam followers move along the cam grooves. In this lens barrel, cam followers are less likely to come out of the cam grooves.

14 Claims, 22 Drawing Sheets

LENS BARREL

CROSS-REFERENCE TO RELATED APPLICATIONS

This application is a Continuation of application Ser. No. 12/864,138, filed Jul. 22, 2010, which is a U.S. National Stage application of PCT/JP2009/000274, filed Jan. 23, 2009, which applications are incorporated herein by reference.

TECHNICAL FIELD

The present invention relates to a lens barrel mountable in optical devices such as a digital still camera, a digital video camera, a mobile telephone with an image pickup device, or the like.

BACKGROUND ART

An imaging apparatus such as a digital still camera is equipped with a lens barrel. Some of the lens barrels house various kinds of lenses like a zoom lens, and can move in an optical axis direction of a camera body. Such a lens barrel sometimes is called a "collapsible lens barrel".

Patent Document 1 discloses a collapsible lens barrel. The collapsible lens barrel disclosed by Patent Document 1 includes a holding frame for holding a lens and a cam ring where the holding frame is incorporated. The holding frame is extendable with respect to the cam ring by the action of the cam.

In such a collapsible lens barrel, the thickness of the lens holding frame constituting the lens barrel affects the thickness of the digital still camera. This is because, in a collapsed state, the lens holding frame is received inside a housing of the digital still camera. Therefore, in order to reduce the thickness of the digital still camera, the lens holding frame is required to be made thinner.

[Patent Document 1] JP 2003-315660 A

DISCLOSURE OF INVENTION

Problem to be Solved by the Invention

However, in the collapsible lens barrel, a higher zooming factor is demanded. In order to satisfy this demand, it is necessary to provide an adequate space between the lens and an imaging element. Therefore, the lens barrel cannot be fully reduced in thickness.

Further, according to the collapsible lens barrel disclosed by Patent Document 1 described above, it is impossible to prevent cam followers from coming out of cam grooves in the case where a retainer wall cannot be provided in an area where a cam follower about to fall out is received directly by the wall, or in the case where the retainer wall provided in the area where a cam follower is received directly is not sufficient.

Therefore, it is an object of the present invention to realize a lens barrel having an improved strength against external shocks and capable of being reduced in thickness. It is also an object of the present invention to provide a lens barrel in which cam followers are less likely to come out of the cam grooves even in the case where a retainer wall cannot be provided in an area where a cam follower about to fall out is received directly by the wall, or in the case where the retainer wall provided in the area where a cam follower is received directly is not sufficient.

Means for Solving Problem

A lens barrel of the present application is a lens barrel that holds a lens for photographing, including: a fixing frame that is provided with a cam groove in an inner circumferential surface of the fixing frame; and a drive frame that includes a cam follower formed on an outer circumferential surface of the drive frame and capable of being fitted in the cam groove, the drive frame being movable with respect to the fixing frame along an optical axis direction of the lens together with a movement of the cam follower along the cam groove, wherein the cam groove at least includes a first region with a first groove width and a second region with a second groove width that is larger than the first groove width, and an outer diameter of the cam follower in a short side direction is substantially equivalent to the first groove width in the first region and an outer diameter thereof in a long side direction is n times (n is a value larger than 1) as large as the outer diameter thereof in the short side direction.

Effect of the Invention

According to the present invention, it is possible to achieve a lens barrel that is fully reduced in thickness compared with the conventional lens barrels.

Further, according to the present invention, it is possible to provide a lens barrel in which cam followers are less likely to come out of the cam grooves even in the case where a retainer wall cannot be provided in an area where a cam follower about to fall out is received directly by the wall, or in the case where the retainer wall provided in the area where a cam follower is received directly is not sufficient.

DESCRIPTION OF PREFERRED EMBODIMENT

Figure 1:
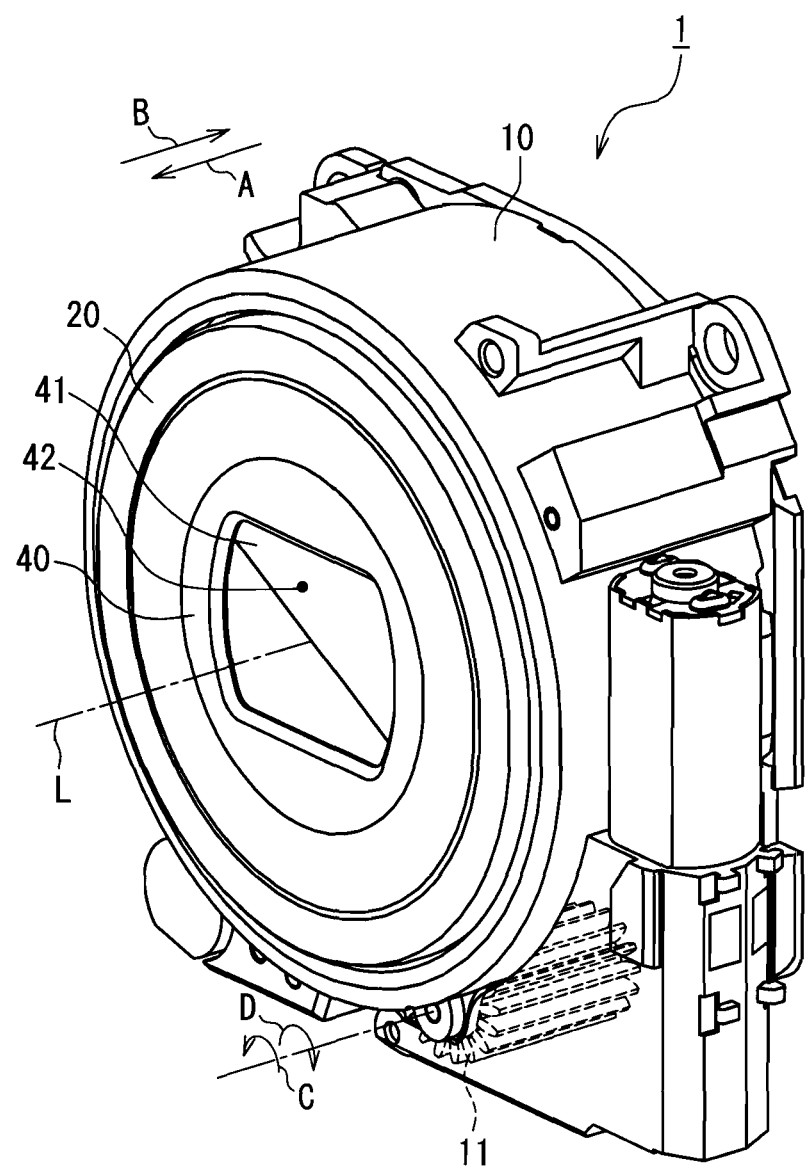
FIG. 1 is a perspective view showing an external view of an imaging apparatus in Embodiment 1.

A lens barrel of the present application is a lens barrel that holds a lens for photographing, including: a fixing frame that is provided with a cam groove in an inner circumferential surface of the fixing frame; and a drive frame that includes a cam follower formed on an outer circumferential surface of the drive frame and capable of being fitted in the cam groove, the drive frame being movable with respect to the fixing frame along an optical axis direction of the lens together with a movement of the cam follower along the cam groove, wherein the cam groove at least includes a first region with a first groove width and a second region with a second groove width that is larger than the first groove width, and an outer diameter of the cam follower in a short side direction is substantially equivalent to the first groove width in the first region and an outer diameter thereof in a long side direction is n times (n is a value larger than 1) as large as the outer diameter thereof in the short side direction. Thus, when an external force is applied to the drive frame, it is possible to prevent the cam follower from coming out of the cam groove.

Based on the configuration described above, the lens barrel of the present application may have the following aspects.

In the lens barrel of the present application, lateral surfaces of the cam groove in the first region and lateral surfaces of the cam groove in the second region are connected by curved surfaces. With this configuration, the cam follower can move inside the cam groove smoothly.

The lens barrel of the present application further includes a rectilinear frame that is arranged in a coaxial position with the fixing frame and is movable in the optical axis direction, wherein the rectilinear frame includes a protruded portion on an outer circumferential cylindrical surface of the rectilinear frame, the fixing frame includes a rectilinear groove capable of being fitted freely with the protruded portion and guiding a movement of the rectilinear frame in the optical axis direction while restricting rotation of the rectilinear frame, and the rectilinear groove is formed so that at least a part of the rectilinear groove is superimposed with the cam groove. With this configuration, an outer diameter of the fixing frame can be reduced, whereby the lens barrel can be downsized.

In the lens barrel of the present application, the cam groove includes a parallel portion substantially in parallel with a circumferential direction of the fixing frame and an inclined portion inclined with respect to the circumferential direction of the fixing frame, and the cam follower includes lateral surfaces substantially in parallel with respect to the parallel portion and lateral surfaces substantially in parallel with respect to the inclined portion. With this configuration, the position of the cam follower can be firmed whether the cam follower is located in the inclined portion or the parallel portion.

In the lens barrel of the present application, the cam groove includes a plurality of regions having different groove widths, and the groove widths between a plurality of the regions having different groove widths of the cam groove are formed so as to be changed continuously. With this configuration, the cam follower can move smoothly.

In the lens barrel of the present application, a groove width of a part of the rectilinear groove that is superimposed with the cam groove is smaller than a groove width of the cam groove into which the cam follower is inserted. With this configuration, at the time of assembling the lens barrel, it is possible to prevent the cam follower from mistakenly being inserted into the rectilinear groove, whereby the workability in assembling the lens barrel can be improved.

Embodiment 1

[1. Configuration of the Imaging Apparatus]

FIG. 1 illustrates an exemplary apparatus including a lens barrel of the present embodiment. The apparatus shown in FIG. 1 is an imaging apparatus mounted in a digital camera. An imaging apparatus 1 includes various lenses such as a zoom lens and a focus lens, an imaging element that converts incident light into an electric signal and outputs this signal, etc. It should be noted that the imaging apparatus illustrated in the present embodiment merely is an example and can be mounted not only in the digital camera but also a video camera or the like.

In the imaging apparatus 1, a fixing frame 10, a drive frame 20 and a first group unit 40 are arranged at coaxial positions. A gear 11 is disposed in the vicinity of the fixing frame 10. The gear 11 is driven rotationally by a driving means such as a motor. The drive frame 20 and the first group unit 40 are configured to be moved in a direction indicated by an arrow B by rotating the gear 11 in a direction indicated by an arrow C and moved in a direction indicated by an arrow A by rotating the gear 11 in a direction indicated by an arrow D. FIG. 1 shows the imaging apparatus 1 in the state where the drive frame 20 and the first group unit 40 are housed in the fixing frame 10 (hereinafter, referred to as a collapsed state), and the drive frame 20 and the first group unit 40 can be extended in the direction indicated by the arrow A by rotating the gear 11. Further, an end surface of the first group unit 40 is provided with a plate-like lens barrier 41. The lens barrier 41 can open or close an opening 42 of the first group unit 40.

Figure 2:
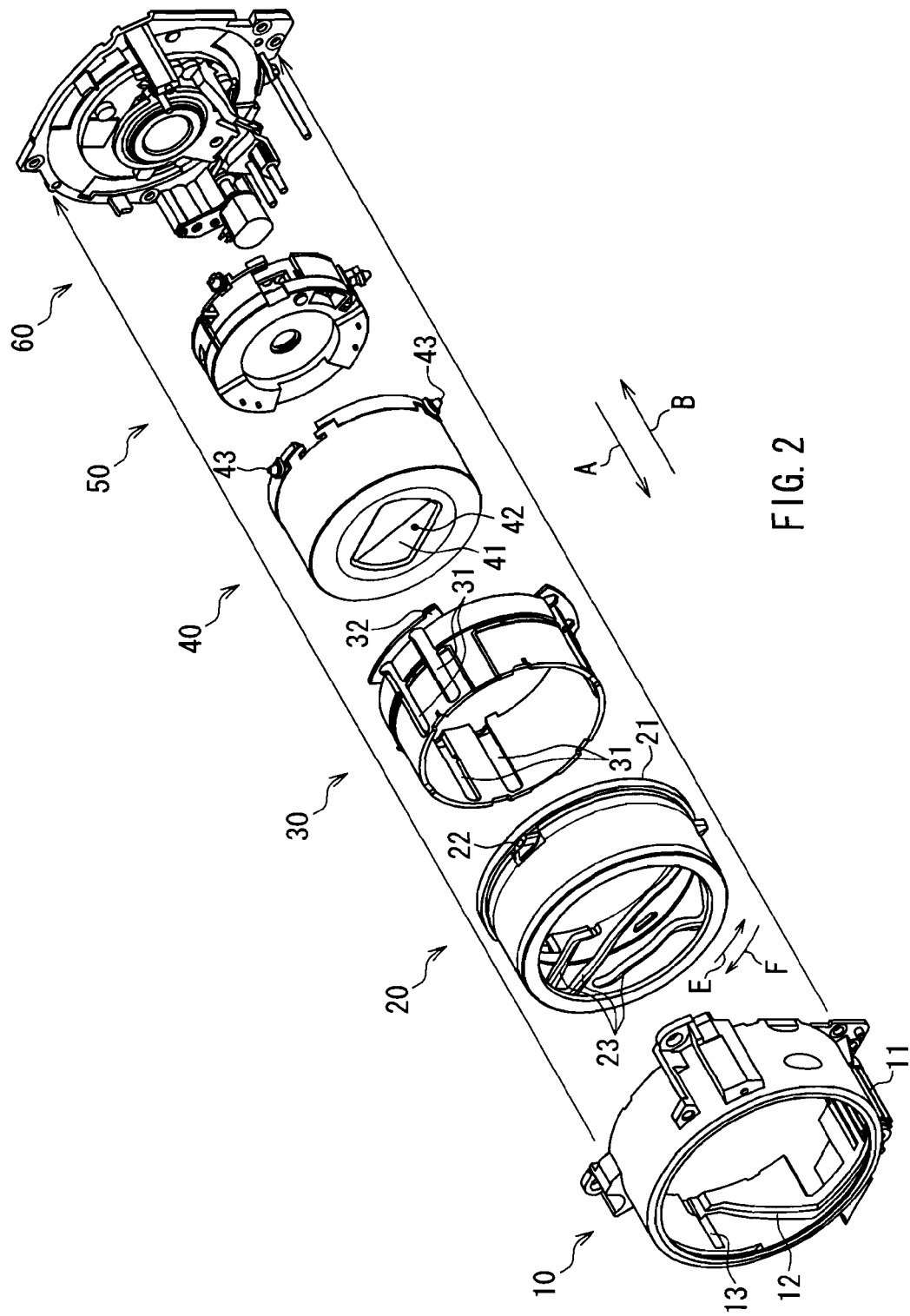
FIG. 2 is an exploded perspective view of the imaging apparatus.

FIG. 2 is an exploded perspective view showing individual units included in the imaging apparatus 1. As shown in FIG. 2, the imaging apparatus 1 is provided with the fixing frame 10, the drive frame 20, a rectilinear frame 30, the first group unit 40, a second group unit 50 and a base 60. Incidentally, in the description below, an outer circumferential surface of a cylindrical portion in substantially cylindrical members such as the fixing frame 10, the drive frame 20 and the rectilinear frame 30 is referred to as an "outer surface," and an inner circumferential surface of the cylindrical portion therein is referred to as an "inner surface."

The inner surface of the fixing frame 10 is provided with cam grooves 12. The fixing frame 10 is fixed to a chassis (not shown) of the imaging apparatus 1 together with the base 60. It is preferable to provide a plurality of the cam grooves 12. In the present embodiment, three cam grooves 12 are provided. Further, the inner surface of the fixing frame 10 is provided with a rectilinear groove 13 substantially in parallel with an optical axis direction.

The drive frame 20 is disposed inside the fixing frame 10, and is provided in such a manner as to be rotatable in a circumferential direction and movable in the optical axis direction. Further, the drive frame 20 is movable between a position at which it is housed in the fixing frame 10 and a position at which it partially protrudes in the optical axis direction beyond the fixing frame 10. Additionally, the outer surface of the drive frame 20 is provided with cam followers 22. It is preferable to provide a plurality of the cam followers 22. In the present embodiment, the number of the cam followers 22 is three, which is the same as the number of the cam grooves 12. The cam followers 22 are fitted movably in the cam grooves 12 that are formed in the fixing frame 10. Further, the inner surface of the drive frame 20 is provided with a plurality of the cam grooves 23. The outer surface of the drive frame 20 is provided with a rack 21 along the circumferential direction (see FIG. 3). The rack 21 is in engagement with the gear 11 when the drive frame 20 is attached to the fixing frame 10. In this way, by rotating the gear 11 in the direction indicated by the arrow C or the arrow D, it is possible to rotate the drive frame 20 in a direction indicated by an arrow E or an arrow F.

The rectilinear frame 30 is disposed inside the drive frame 20, and is provided in such a manner as to be rotatable in the circumferential direction. Further, the rectilinear frame 30 is provided so as to move together with the drive frame 20 when the drive frame 20 moves in the direction indicated by the arrow A or the arrow B (see FIG. 1). Moreover, a plurality of long holes 31 are formed in the cylindrical portion of the rectilinear frame 30. The long holes 31 are formed in such a manner as to be substantially in parallel with the optical axis direction of the rectilinear frame 30 and to penetrate from the outer surface to the inner surface of the rectilinear frame 30. The outer surface of the rectilinear frame 30 is provided with a rectilinear key 32. The rectilinear key 32 is fitted movably in the rectilinear groove 13 in the fixing frame 10.

The first group unit 40 is disposed inside the rectilinear frame 30, and includes an objective lens, etc. Further, the first group unit 40 has at its end surface in the optical axis direction the lens barrier 41 capable of opening and closing the opening 42. The outer surface of the first group unit 40 is provided with a plurality of cam followers 43. The cam followers 43 are fitted movably in the cam grooves 23 formed in the drive frame 20 via the long holes 31 formed in the rectilinear frame 30. Therefore, the drive frame 20 rotates in the direction indicated by the arrow E or the arrow F, whereby the first group unit 40 moves in the optical axis direction.

The second group unit 50 includes a shutter unit, a second group lens, etc.

The base 60 is fixed to the chassis (not shown) of the imaging apparatus 1, and includes a focus lens, an imaging element, etc.

Incidentally, the fixing frame 10 is an example of a first frame. The drive frame 20 is an example of a second frame. Further, the directions indicated by the arrow A and the arrow B are substantially in parallel with the optical axis of the imaging apparatus 1. The directions indicated by the arrow E and the arrow F are circumferential directions, with the optical axis of the imaging apparatus 1 serving as the center.

In the following, the operation will be explained.

The collapsed state shown in FIG. 1 corresponds to a power-off state of a digital camera including the imaging apparatus 1. In the collapsed state shown in FIG. 1, the drive frame 20, the rectilinear frame 30, the first group unit 40 and the second group unit 50 are housed in the fixing frame 10. Further, the lens barrier 41 is closed.

Turning on the power of the digital camera in this state causes the driving means such as the motor to be energized and start driving. When the motor starts driving, the gear 11, which is directly or indirectly engaged with an output shaft of the motor, rotates in the direction indicated by the arrow C. By the rotation of the gear 11 in the direction indicated by the arrow C, the drive frame 20 rotates in the direction indicated by the arrow E because the gear 11 and the rack 21 are engaged with each other. The rotation of the drive frame 20 causes the cam followers 22 to move inside the cam grooves 12, whereby the drive frame 20 moves in the direction indicated by the arrow A by the cam driving of the cam grooves 12 and the cam followers 22. In other words, the drive frame 20 moves from the collapsed state shown in FIG. 1 in the direction indicated by the arrow A while rotating in the direction indicated by the arrow E. Moreover, since the rectilinear key 32 is fitted freely in the rectilinear groove 13, the rectilinear frame 30 moves in the direction indicated by the arrow A along with the movement of the drive frame 20 in the direction indicated by the arrow A.

Furthermore, by the rotation of the drive frame 20 in the direction indicated by the arrow E, the cam followers 43 move inside the cam grooves 23, so that first group unit 40 moves in the direction indicated by the arrow A. Here, the rectilinear frame 30 moves in the direction indicated by the arrow A together with the drive frame 20 while its rotation in the circumferential direction is restricted due to the fact that the rectilinear key 32 is fitted freely in the rectilinear groove 13.

Incidentally, the recognition of an operating state of various operating means such as a power supply switch in the digital camera and the control of individual portions in the digital camera are executed by a control means such as a control microcomputer.

By the operation described above, it is possible to move the drive frame 20, the rectilinear frame 30 and the first group unit 40 to the position protruding beyond the fixing frame 10 in the direction indicated by the arrow A. This state corresponds to a photographing standby state. When a user operates a zoom switch (not shown) mounted in the digital camera in the photographing standby state, the control means controls a zoom lens (not shown) to move in the optical axis direction and perform a zooming operation. Incidentally, although the digital camera including the imaging apparatus 1 can execute not only the zooming operation but also a focusing operation, a photographing operation, etc., the detailed description thereof will be omitted in the instant specification.

[2. Configuration of the Cam Mechanism]

Figure 3:
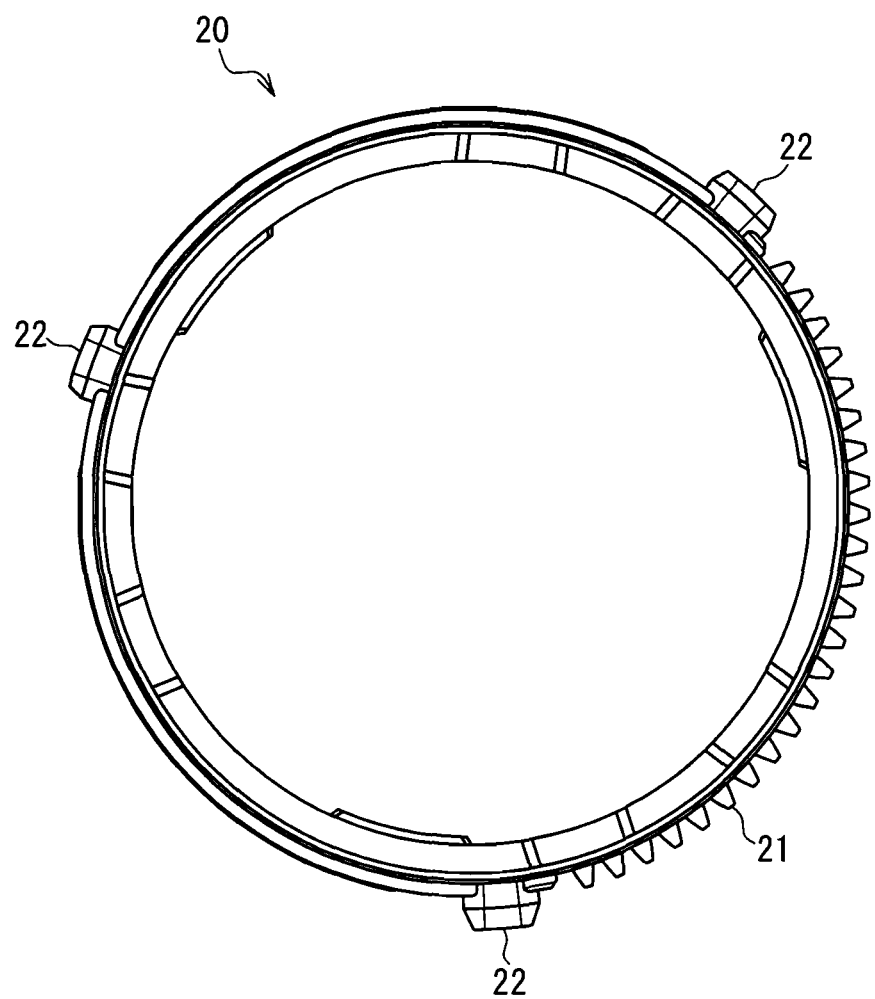
FIG. 3 is a side view of a drive frame.
Figure 4A:
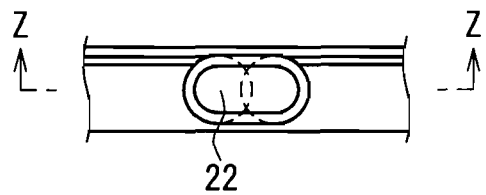
FIG. 4A is a top view showing the vicinity of a cam follower in the drive frame.
Figure 4B:
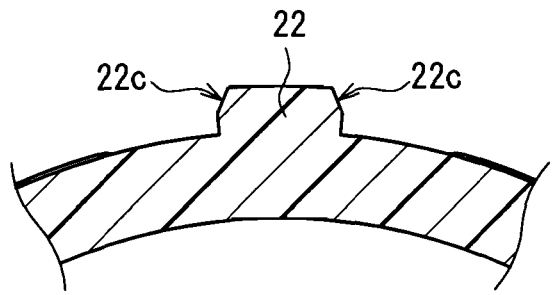
FIG. 4B is a side view of the cam follower.
Figure 4C:
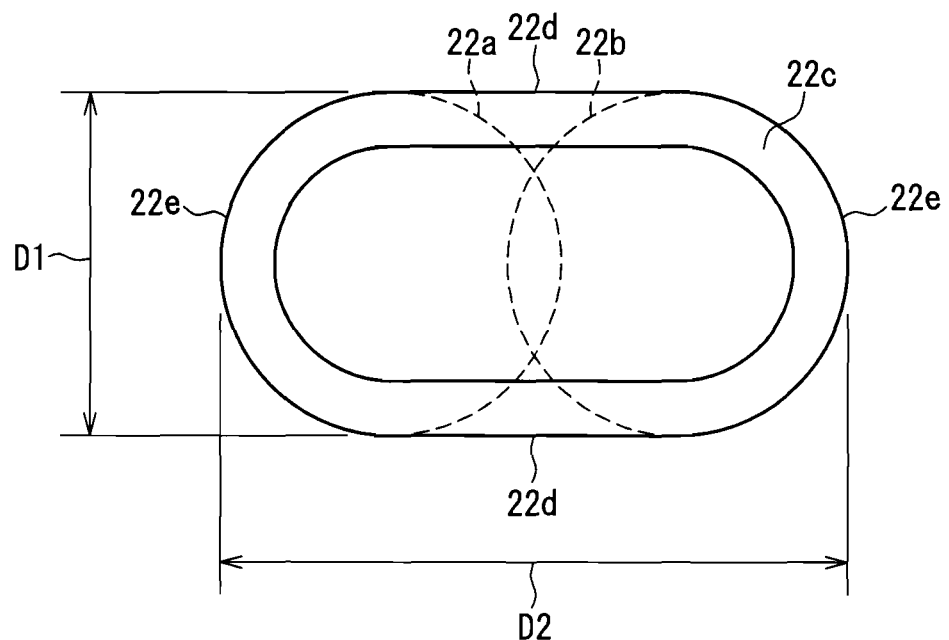
FIG. 4C is a top view of the cam follower.

FIG. 3 is a plan view of the drive frame 20, seen from the direction indicated by the arrow B in FIG. 2. As shown in FIG. 3, the outer surface of the drive frame 20 is provided with three cam followers 22. FIG. 4A is a top view showing the vicinity of the cam follower 22 in the drive frame 20. FIG. 4B is a cross-sectional view taken along a line Z-Z in FIG. 4A. FIG. 4C is an enlarged view of the cam follower 22.

As shown in FIG. 4A, the cam follower 22 is formed such that a top surface and a bottom surface thereof have a cylindrical and substantially elliptical shape. Specifically, as shown in FIG. 4C, the cam follower 22 is formed in a shape obtained when two perfect circles 22a and 22b are disposed hypothetically side by side. In the present embodiment, a width dimension D2 of the cam follower 22 substantially is twice as large as a depth dimension D1, but the relationship between the dimension D1 and the dimension D2 is merely illustrative, and the dimension D2 may be 1.5 times as large as the dimension D1, or three or more times larger than the dimension D1. That is, it is only necessary that at least the dimension D2 is n times as large as the dimension D1 (n is a value larger than 1. Note that n is not limited to a natural number and may be a decimal number). As the value of the dimension D2 is increased, the cross section of the cam followers 22 is increased and higher rigidity is obtained. However, when the value of the dimension D2 is set too large, the groove width of the cam groove 12 consequentially is required to be made large, which results in a larger fixing frame 10. Therefore, it is preferable that the dimension D2 is substantially twice as large as the dimension D1, as in the present embodiment.

Further, as shown in FIG. 4B, an inclined portion 22c is formed on the edge of the top surface of the cam followers 22. An inclination angle of the inclined portion 22c is equivalent to an inclination angle of lateral surfaces of the cam groove 12. Therefore, the inclined surface 22c can come into surface contact with the lateral surfaces of the cam groove 12 at the time when the cam follower 22 is fitted freely in the cam grooves 12.

Figure 5:
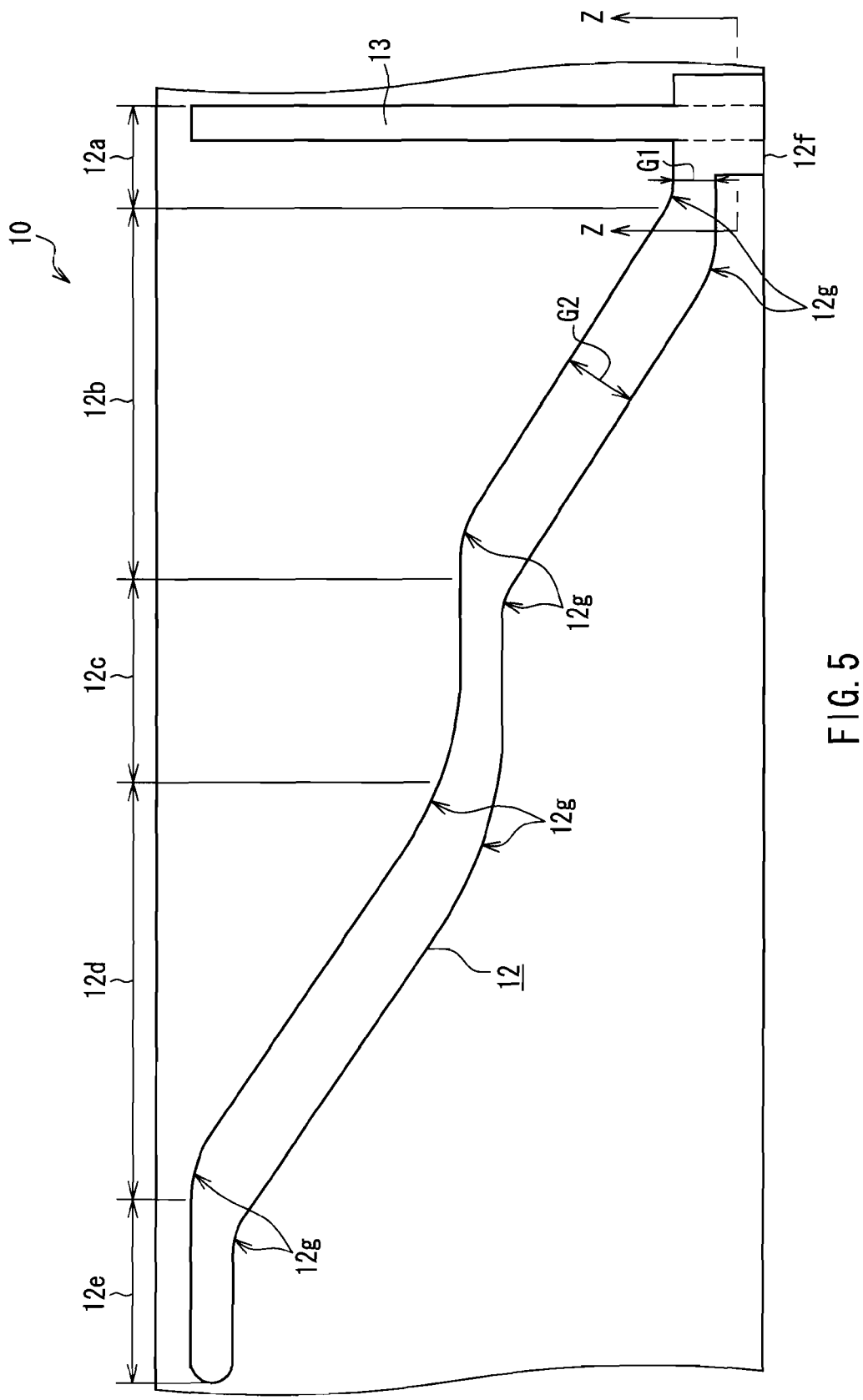
FIG. 5 is a schematic diagram showing a configuration of an inner surface of a fixing frame.

FIG. 5 is a diagram schematically showing a configuration of the vicinity of the cam groove 12 formed in an inner surface of the fixing frame 10. Each of the cam grooves 12 includes a first region 12a, a second region 12b, a third region 12c, a fourth region 12d and a fifth region 12e.

The first region 12a is located in one end portion of the cam groove 12 and is a region where the cam follower 22 is located when the drive frame 20 is in a collapsed position. A groove width G1 in the first region 12a has a dimension that allows end portions 22d of the cam follower 12 in a short side direction (see FIG. 4C) to come into contact with the groove. Further, the lateral surfaces in the first region 12a (lateral surfaces formed in the direction of the cam groove 12) are formed in a direction substantially in parallel with the circumferential direction of the fixing frame 10.

The second region 12b is formed continuously to the first region 12a and is a region where the cam follower 22 moves at the time the drive frame 20 moves between the collapsed position and a protruding position. A groove width G2 in the second region 12b has a dimension that allows end portions 22e of the cam follower 22 in a long side direction (see FIG. 4C) to come into contact with the groove. Further, the lateral surfaces in the second region 12b are formed in a direction inclined with respect to the circumferential direction of the fixing frame 10.

The third region 12c is formed continuously to the second region 12b and is a region where the cam follower 22 is located when the drive frame 20 is in the protruding position. Further, the third region 12c has a groove width that allows the end portions 22d of the cam follower 22 in the short side direction to come into contact with the groove and that is equivalent to the groove width G1 in the first region 12a. Further, the lateral surfaces in the third region 12c are formed in the direction substantially in parallel with the circumferential direction of the fixing frame 10. Further, when the cam follower 22 is located in the third region 12c, a zoom lens is located at a wide-angle end.

The fourth region 12d is formed continuously to the third region 12c and is a region where the cam follower 22 moves at the time the zoom lens moves between the wide-angle end and a telephoto end. Further, the fourth region 12d has a groove width that allows the end portions 22e of the cam follower 22 in the long side direction to come into contact with the groove and that is equivalent to the groove width G2 in the second region 12b. Further, the lateral surfaces in the fourth region 12d are formed in the direction inclined with respect to the circumferential direction of the fixing frame 10.

The fifth region 12e is formed continuously to the fourth region 12d and is a region where the cam follower 22 is located when the zoom lens is located at the telephoto end. Further, the fifth region 12e has a groove width that allows the end portions 22d of the cam follower 22 in the short side direction to come into contact with the groove and that is equivalent to the groove width G1 in the first region 12a. Further, the lateral surfaces in the fifth region 12e are formed in the direction substantially in parallel with the circumferential direction of the fixing frame 10.

An opening 12f is provided for inserting the cam follower 22 into the cam groove 12 and has a width dimension at least larger than the width dimension D2 (see FIG. 4C) of the cam follower 22.

Curved portions 12g are formed on the lateral surfaces between the respective regions of the cam groove 12. Two opposing curved portions 12g between the respective regions are a pair of the curved portions. The lateral surfaces in the respective regions of the cam groove 12 substantially are formed of flat surfaces but the respective regions are connected with each other by curved surfaces (curved portions 12g). Further, the curved portions 12g are formed on the respective opposing lateral surfaces of the cam groove 12. Further, the curved portions 12g are formed to have a groove width that allows the inclined surface 22c of the cam follower 22 to come into contact with the groove constantly during the movement of the cam follower 22 from the region to another region. In the cam groove 12 of the present embodiment, adjacent regions have different groove widths, so that the groove width of the paired curved portions 12g is formed to become gradually wide or narrow toward the adjacent regions.

Figure 6:
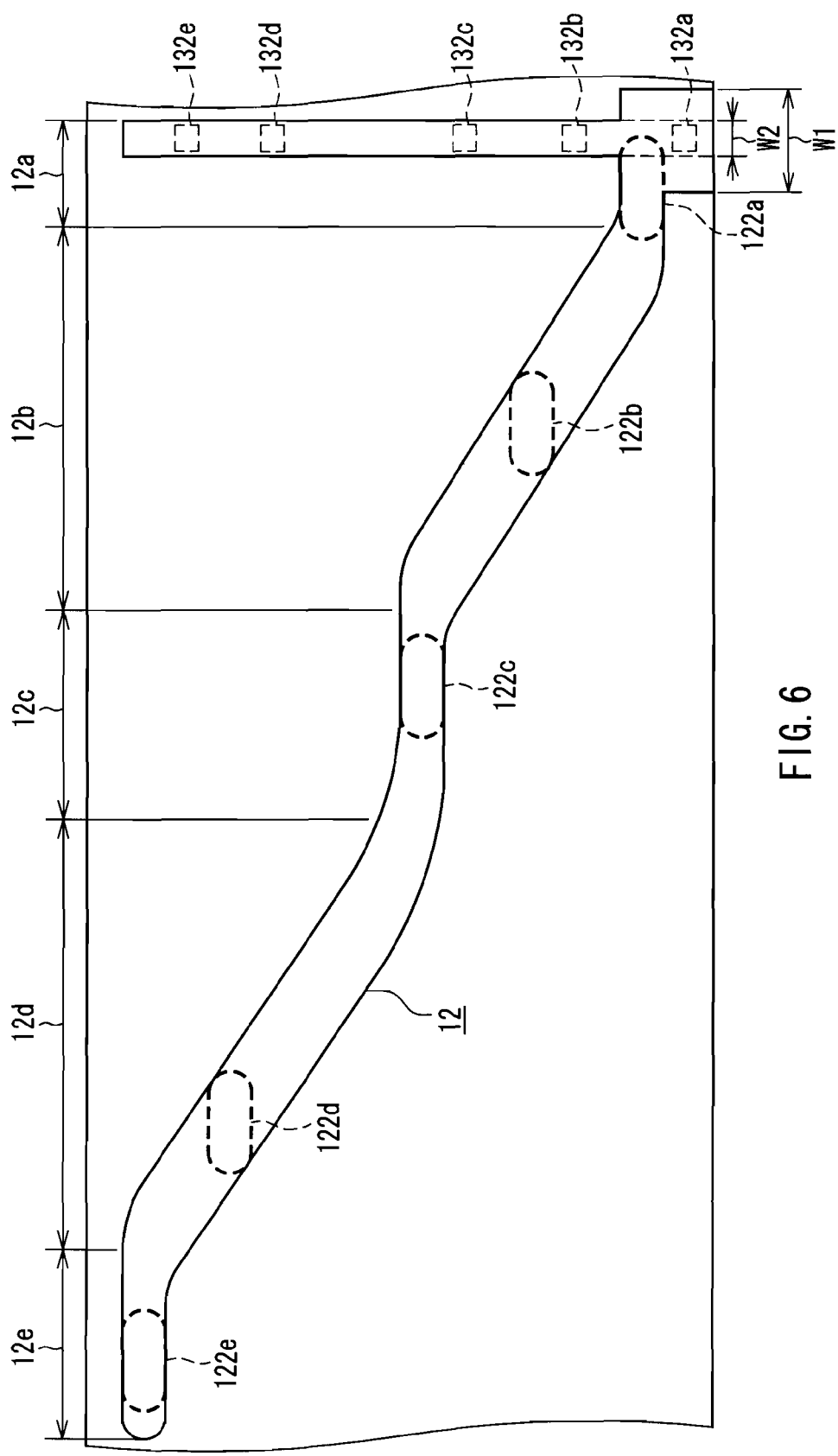
FIG. 6 is a schematic diagram showing a configuration of an inner surface of the fixing frame.

FIG. 6 is a drawing illustrating the movement of the cam follower 22 with respect to the cam groove 12, showing a configuration of an inner surface of the fixing frame 10. Hereinafter, the movement of the cam follower 22 will be described.

First, when the drive frame 20 is at the collapsed position, the cam follower 22 is located within the first region 12a (for example, at the position 122a). At this time, the end portions 22d of the cam follower 22 in the short side direction come into contact with the lateral surfaces of the cam groove 12, whereby looseness in the width direction of the cam groove 12 is suppressed while the position is restricted.

Next, turning on the power of the imaging apparatus 1 and the rotation of the drive frame 20 by a motor (not shown) cause the cam follower 22 located in the first region 12a to move into the second region 12b (for example, at the position 122b). While the cam follower 22 moves inside the second region 12b, the end portions 22e thereof in the long side direction constantly come into contact with the lateral surfaces of the cam groove 12, whereby looseness of the cam groove 12 in the width direction is suppressed. Thus, the drive frame 20 moves toward the protruding position.

Next, when the drive frame 20 arrives in the protruding position, the cam follower 22 moves into the third region 12c (for example, at the position 122c). While the cam follower 22 is located within the third region 12c, the end portions 22d thereof in the short side direction constantly come into contact with the lateral surfaces of the cam groove 12, whereby the looseness of the cam groove 12 in the width direction is suppressed while the position is restricted. At this time, the zoom lens is at the wide-angle end.

Next, when the zoom switch mounted in the imaging apparatus 1 is operated by the user and an instruction of moving the zoom lens to the telephoto side is input, the cam follower 22 moves from the third region 12c into the fourth region 12d (for example, at the position 122d). While the cam follower 22 is located within the fourth region 12d, the end portions 22e thereof in the long side direction constantly come into contact with the lateral surfaces of the cam groove 12, whereby the looseness of the cam groove 12 in the width direction is suppressed. Further, during the movement of the cam follower 22 within the fourth region 12d, the end portions 22e thereof in the long side direction constantly come into contact with the lateral surfaces of the cam groove 12. Incidentally, although the position of the zoom lens changes in accordance with the operation amount of the zoom switch, the inclined surface 22c of the cam follower 22 constantly comes into contact with the lateral surfaces of the cam groove 12, regardless of the position of the zoom lens. Therefore, at any position of the zoom lens, the looseness between the cam follower 22 and the cam groove 12 can be suppressed.

When the zoom lens is moved to the telephoto end, the cam follower 22 moves into the fifth region 12e (at the position 122e). While the cam follower 22 is located in the fifth region 12e, the end portions 22d thereof in the short side direction constantly come into contact with the lateral surfaces of the cam groove 12, whereby looseness of the cam groove 12 in the width direction is suppressed while the position is restricted.

Further, when the zoom switch is operated and an instruction of moving the zoom lens to the wide-angle side is input, the cam follower 22 moves from the fifth region 12e or the fourth region 12d into the third region 12c. At this time, the cam follower 22 constantly comes into contact with the lateral surfaces of the cam groove 12, whereby looseness of the cam groove 12 in the width direction is suppressed during the movement.

Further, when an instruction of powering off the imaging apparatus 1 is input, the motor drives the drive frame 20 rotationally, and the cam follower 22 located in any of the third region 12c, fourth region 12d and fifth region 12e moves into the first region 12a via the second region 12b. While moving toward the first region 12a, the cam follower 22 constantly comes into contact with the lateral surfaces of the cam groove 12, whereby looseness is suppressed during the movement.

Further, the curved surfaces (curved portions 12g) are formed on the lateral surfaces between the respective regions of the cam groove 12 and are configured so that the inclined surface 22c of the cam follower 22 constantly comes into contact with the lateral surfaces of the cam groove 12 during the movement of the cam follower 22 from the region to another region. Thus, by forming the curved portions 12g in the cam groove, shocks occurring at the time of the movement of the cam follower 22 between the regions can be suppressed. In the cam groove that is bent substantially in a ">"-shape as disclosed by Patent Document 1, shocks occur due to collisions between the cam follower and the lateral surfaces of the cam groove when the cam follower moves in the bent portion of the cam groove. The shock thus occurring then is transmitted to the user's hand holding the digital camera via the housing of the digital camera body with the imaging apparatus 1, thereby bringing discomfort to the user. In the present embodiment, by forming the curved portions 12g, the occurrence of the shock is suppressed, and the imposition of discomfort to the user can be prevented.

[3. Configuration of the Rectilinear Groove 13]

As shown in FIG. 5, the rectilinear groove 13 of the present embodiment is formed so as to partially overlap with the first region 12a of the cam groove 12. Further, an opening for inserting a rectilinear key (described later) into the rectilinear groove 13 is formed at the same position as the opening 12f of the cam groove 12.

Figure 7:
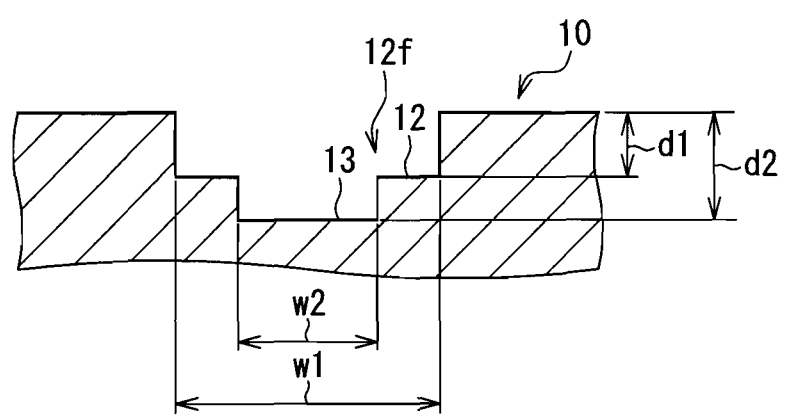
FIG. 7 is a cross-sectional view taken along a line Z-Z in FIG. 5.

FIG. 7 is a cross-sectional view of the rectilinear groove 13 taken along a line Z-Z in FIG. 5. As shown in FIG. 7, the rectilinear groove 13 is formed deeper than a depth d1 of the cam groove 12 (depth d2). Further, a width dimension w2 of the rectilinear groove 13 is formed smaller than a width dimension w1 of the opening 12f and the width dimension D2 of the cam follower 22.

At the time of inserting the cam follower 22 into the cam groove 12, since the width dimension D2 of the cam follower 22 is formed larger than the width dimension w2 of the rectilinear groove 13 and formed smaller than the width dimension w1 of the opening 12f, the cam follower 22 reliably can be inserted into the cam groove 12 without mistakenly being inserted into the rectilinear groove 13. On the other hand, at the time of inserting the rectilinear key 32 formed on the rectilinear frame 30 into the rectilinear groove 13, since the width dimension of the rectilinear key 32 is formed smaller than the width dimension of the rectilinear groove 13, the key 32 reliably can be inserted into the groove.

Figure 8:
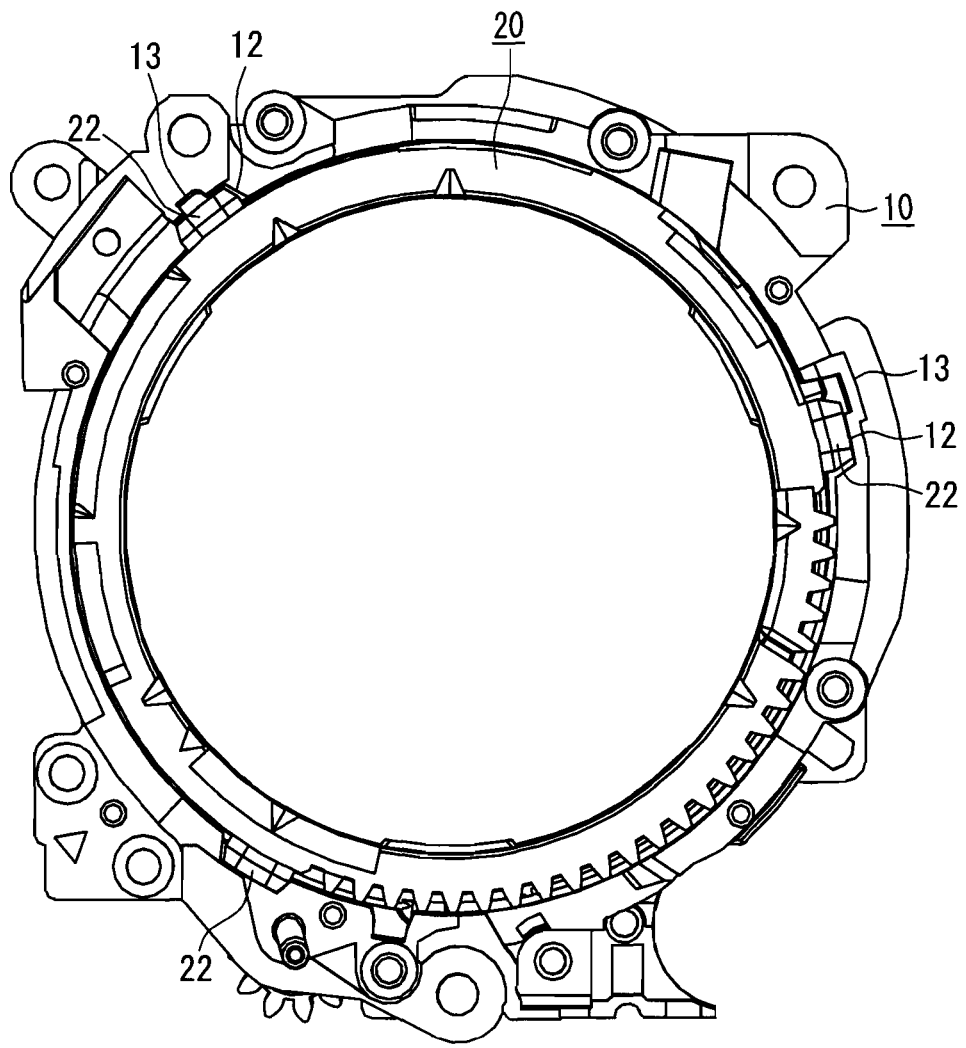
FIG. 8 is a side view showing a state in which the drive frame is incorporated in the fixing frame.
Figure 9:
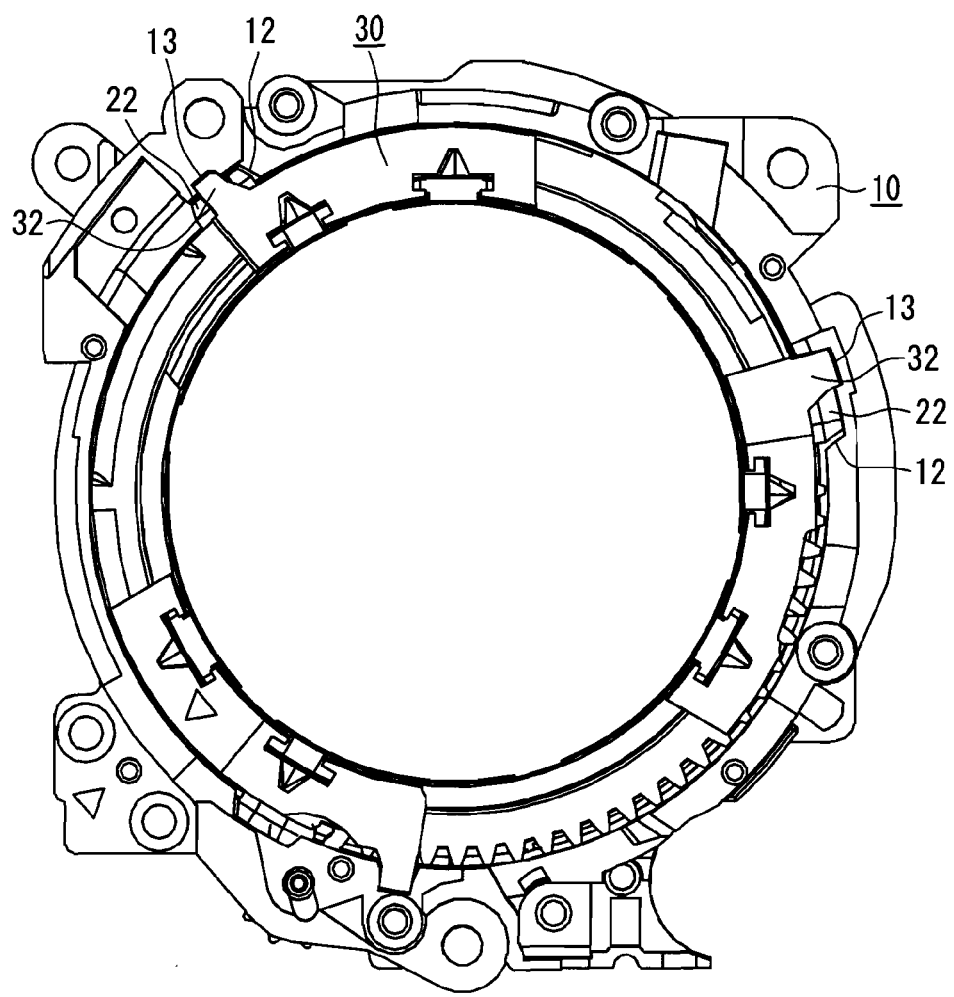
FIG. 9 is a side view showing a state in which the drive frame and a rectilinear frame are incorporated in the fixing frame.

FIG. 8 is a view of the fixing frame 10, with the drive frame 20 inserted therein, seen from the direction indicated by the arrow A (see FIG. 2). FIG. 9 is a view of the fixing frame 10, with the drive frame 20 and the rectilinear frame 30 inserted therein, seen from the direction indicated by the arrow A.

The rectilinear frame 30 moves together with the drive frame 20 in the optical axis direction along with the movement of the drive frame 20 in the optical axis direction. In FIG. 6, positions 132a to 132e indicate the position of the rectilinear key 32 when the cam follower 22 is located at positions 122a to 122e, respectively. In this way, when the rectilinear frame 30 moves in the optical axis direction, the rectilinear key 32 moves inside the rectilinear groove 13 while restricting the movement of the rectilinear frame 30 in a rotational direction.

By forming the rectilinear groove 13 to overlap partially with the cam groove 12, a space for forming the cam groove 12 and the rectilinear groove 13 is reduced in the fixing frame 10, whereby the fixing frame 10 can be downsized. This particularly improves space efficiency of the fixing frame 10 in the circumferential direction, whereby the fixing frame 10 can be reduced in diameter.

[4. Effects of the Embodiment, Etc.]

According to the present embodiment, the rigidity of the cam follower 22 is increased as a result of increasing the outer diameter of the cam follower 22, whereby when an external shock is applied to the imaging apparatus 1, the possibility of breaking the cam follower 22 can be reduced.

Further, shapes of the cam follower 22 and the cam groove 12 can be designed easily as a result of setting the outer diameter of the cam follower 22 in the short side direction to be the outer diameter of the conventional cam follower having a substantially perfect circular shape, and setting the outer diameter of the cam follower 22 in the long side direction to be n times (substantially twice in the present embodiment) as large as that of the cam follower having a substantially perfect circular shape.

Further, the occurrence of the shock to the cam follower 22 during the movement of the cam follower 22 between the regions can be suppressed as a result of forming the curved portions 12g between the respective regions of the cam groove 12. In this way, the shock is not transmitted to the housing of the digital camera body with the imaging apparatus 1, whereby the transmission of the shock to the user's hand that holds the imaging apparatus 1 can be prevented.

Further, the fixing frame 10 can be downsized as a result of forming the rectilinear groove 13 to overlap partially with the cam groove 12. Particularly, the space efficiency of the fixing frame 10 in the circumferential direction is improved, whereby the fixing frame 10 can be reduced in diameter.

Further, in the insertion of the cam follower 22 into the cam groove 12, the cam follower 22 can be prevented from mistakenly being inserted into the rectilinear groove 13 as a result of forming the groove width w1 (see FIG. 6) of the rectilinear groove 13 to be smaller than the groove width w2 (see FIG. 6) of the cam follower insertion portion in the cam groove 12. Thus, the workability in incorporating the drive frame 20 into the fixing frame 10 can be improved.

Further, as shown in FIG. 6, the cam follower 22 can move smoothly along the cam groove 12 as a result of forming the cam groove 12 such that each of the regions has a different groove width and the groove width between the regions is changed continuously.

Incidentally, in the present embodiment, the rectilinear groove 13 is formed to be superimposed with the cam groove 12 in the first region 12a, but similar effects can be obtained when the rectilinear groove 13 is formed to be superimposed with the cam grooves 12 in the fifth region 12e.

Embodiment 2

[1. Configuration of the Imaging Apparatus]

An imaging apparatus according to Embodiment 2 includes a fixing frame, a drive frame, a rectilinear frame, a first group unit, a second group unit and a base, as in the imaging apparatus according to Embodiment 1.

Figure 10:
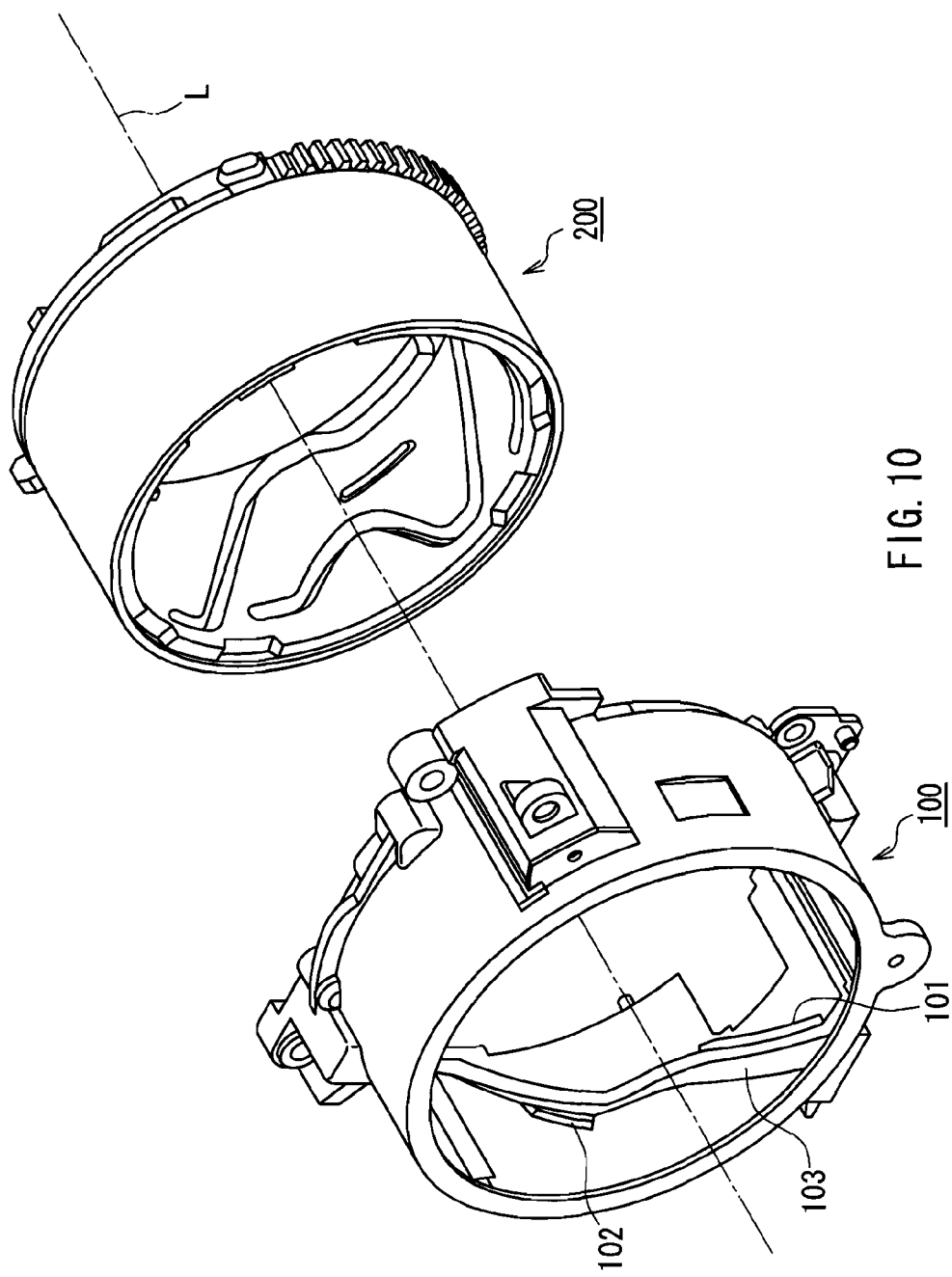
FIG. 10 is a perspective view of a fixing frame and a drive frame according to Embodiment 2.

FIG. 10 is a perspective view of a fixing frame 100 and a drive frame 200 in the imaging apparatus according to Embodiment 2. The fixing frame 100 is formed in a substantially cylindrical shape and the inner surface thereof is provided with cam grooves 103, 104 and 105 (only the cam groove 103 is shown in FIG. 10). The shape of the cam grooves 103, 104 and 105 and the position thereof in the fixing frame 100 are equivalent to those of the cam groove 12 (see FIG. 6) according to Embodiment 1, and hence the detailed description is omitted. In the vicinity of the cam groove 103, protrusions 101 and 102 are formed. The protrusions 101 and 102 will be described in detail later. The drive frame 200 is formed in a substantially cylindrical shape and the outer surface thereof is provided with a plurality of engaging teeth 200a. The plurality of engaging teeth 200a will be described in detail later.

[2. Configuration of the Fixing Frame]

Figure 11:
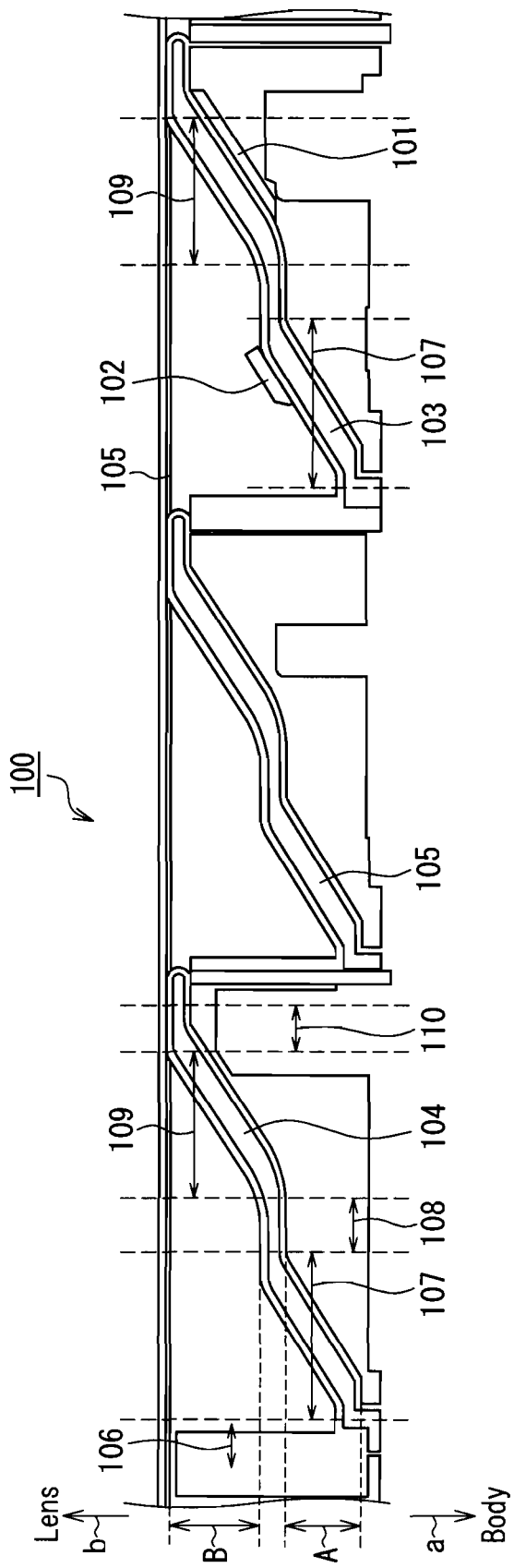
FIG. 11 is a development view of an inner circumferential surface of the fixing frame.

FIG. 11 is a development view showing an inner circumferential surface of the fixing frame 100.

As shown in FIG. 11, the fixing frame 100 is provided with the cam grooves 103, 104 and 105, all of which have the same shape. For example, the cam groove 103 includes a horizontal portion 106, an inclined portion 107, a horizontal portion 108, an inclined portion 109 and a horizontal portion 110. The horizontal portions 106, 108 and 110 are substantially horizontal to the circumferential direction of an outer circumferential cylindrical surface of the fixing frame 100. The inclined portions 107 and 109 are inclined to the circumferential direction of the outer circumferential cylindrical surface of the fixing frame 100.

The fixing frame 100 includes the protrusions 101 and 102 along the cam groove 103. These protrusions 101 and 102 form wall surfaces along the cam groove 103. The protrusion 101 is formed along the inclined portion 107 and the protrusion 102 is formed along the inclined portion 109.

Here, the direction indicated by an arrow a shown in FIG. 11 is a direction of the digital camera body side when the lens barrel according to the present embodiment is attached to the digital camera body (not shown). Further, the direction indicated by an arrow b shown in FIG. 11 is a direction of the lens side when the lens barrel according to the present embodiment is attached to the digital camera body (not shown).

It is possible to form protrusions on lateral edge parts of the cam groove 103 on the side indicated by the arrow a and on the side indicated by the arrow b. The protrusion 101 is formed along the lateral edge part thereof on the side indicated by the arrow a in the inclined portion 107. The protrusion 102 is formed along the lateral edge part thereof on the side indicated by the arrow b in the inclined portion 109.

Incidentally, in the present embodiment, the protrusions 101 and 102 protrude horizontally along the cam groove 103 to form wall surfaces. However, the present invention is not limited to this configuration, and a plurality of protruded portions may be formed along the cam groove 103. In short, it is only necessary that protrusions are provided along the cam groove 103.

[3. Configuration of the Drive Frame]

Figure 12A:
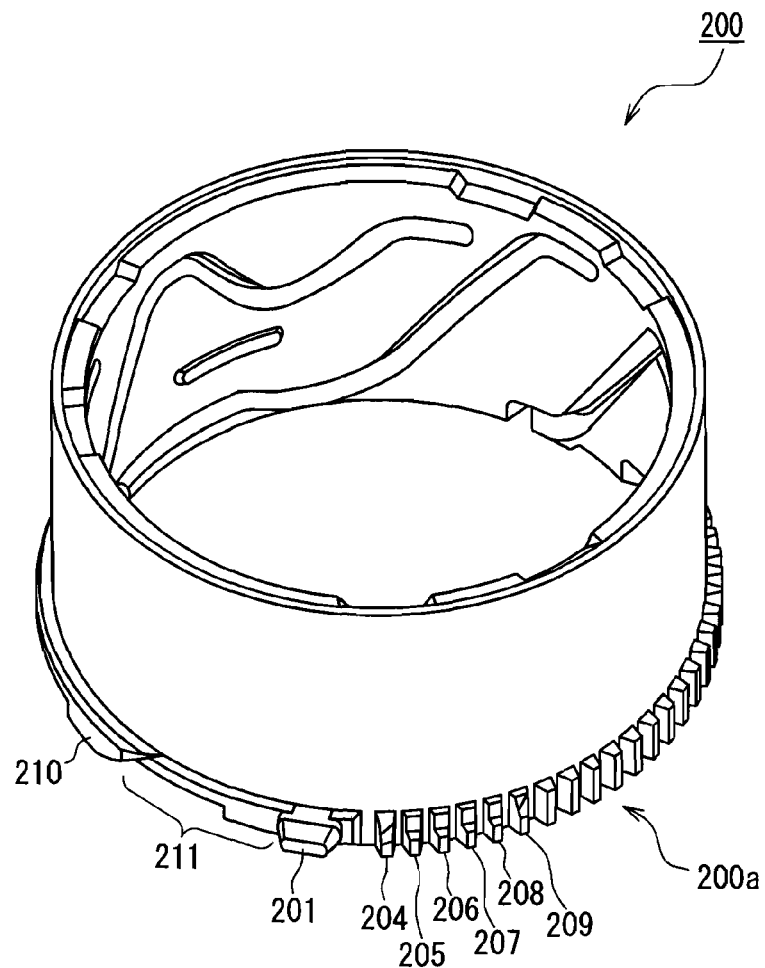
FIG. 12A is a perspective view showing a front surface of the drive frame, seen from an obliquely upward direction.
Figure 12B:
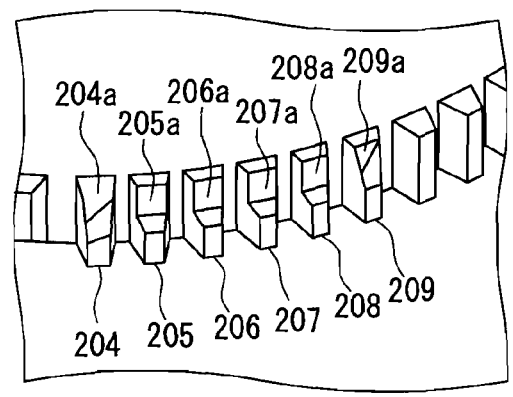
FIG. 12B is an enlarged view showing the vicinity of the engaging teeth in FIG. 12A.
Figure 13:
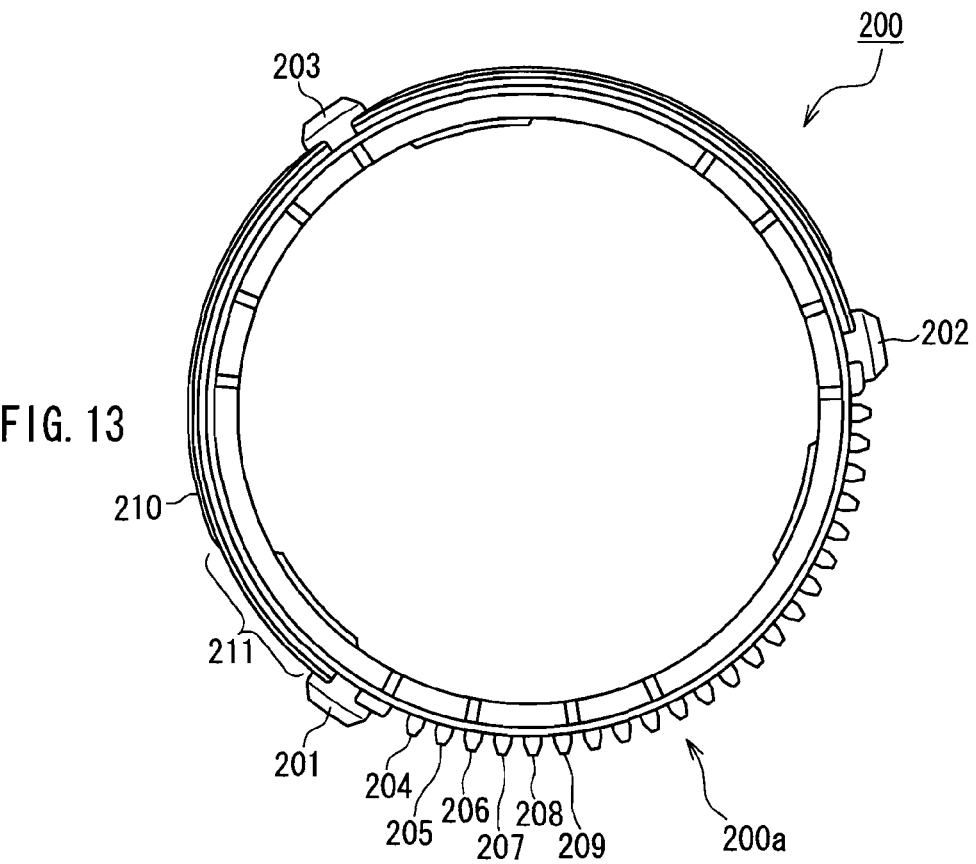
FIG. 13 is a top view of the drive frame.
Figure 14:
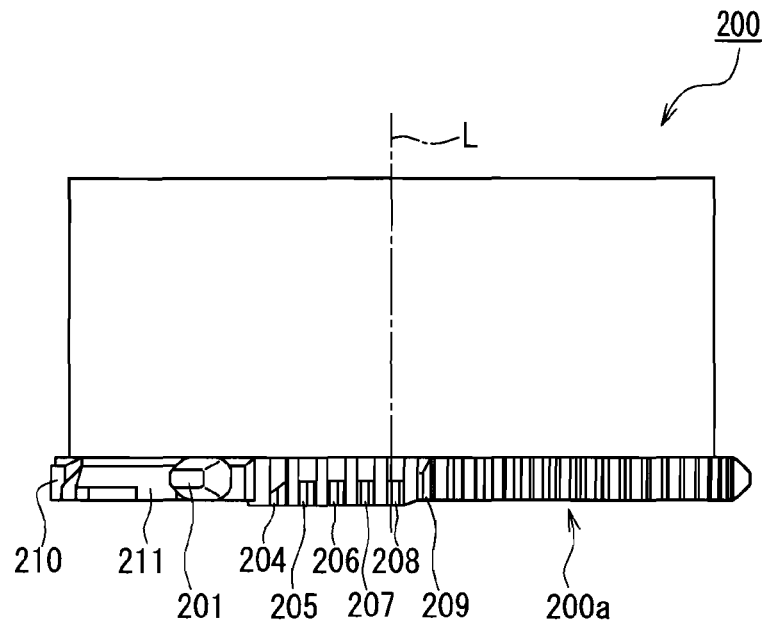
FIG. 14 is a side view of the drive frame.

FIG. 12A is a perspective view of a front surface of the drive frame 200, seen from an obliquely upward direction. FIG. 12B is an enlarged perspective view in the vicinity of the engaging teeth 204 to 209 in FIG. 12A. FIG. 13 is a top view of the drive frame 200. FIG. 14 is a side view of the drive frame 200.

The outer circumferential surface of drive frame 200 is provided with cam followers 201, 202 and 203. The cam followers 201, 202 and 203 can be fitted movably in the cam grooves 103 to 105, which are formed in the fixing frame 100.

The outer circumferential surface of the drive frame 200 is provided with a plurality of the engaging teeth 200a, such as an engaging tooth 204, engaging tooth 205, engaging tooth 206, engaging tooth 207, engaging tooth 208 and engaging tooth 209. These engaging teeth 200a are engaged with teeth such as a gear (not shown) arranged inside or outside of the lens barrel (not shown). As shown in FIG. 12B, the engaging teeth 204 to 209 have notches 204a to 209a, respectively. The notches 205a, 206a, 207a and 208a are notched substantially horizontal to the circumferential direction of the drive frame 200. The notches 204a and 209a are notched obliquely to the circumferential direction of the drive frame 200.

The cam followers 201, 202, 203 and a plurality of the engaging teeth 200a are provided on the same circumference of the outer circumferential surface of the drive frame 200 (see FIG. 13). Further, the cam followers 201, 202, 203 and a plurality of the engaging teeth 200a are formed in the vicinity of the end of the drive frame 200 in the optical axis L direction (see FIGS. 12A and 14).

Incidentally, in the present embodiment, three cam followers and a plurality of the engaging teeth are formed on the same circumference of the outer circumferential surface of the drive frame 200. However, the present invention is not limited to this configuration. It is only necessary that three cam followers and a plurality of engaging teeth are provided on substantially the same circumference.

In this way, it is possible that the drive frame 200 moves almost a maximum length with respect to the fixing frame 100 when moving along the optical axis direction of the lens (L axis direction). Therefore, the lens barrel according to the present embodiment can become thinnest among the lens barrels whose drive frame 200 moves the same distance with respect to the fixing frame 100 along the optical axis direction of the lens. In other words, the width dimension of the fixing frame 100 in the optical axis direction can be reduced, whereby the lens barrel is reduced in thickness.

Further, the outer circumferential surface of drive frame 200 is provided with a raised portion 210. The raised portion 210 is formed close to the end of the outer circumferential surface of the drive frame 200 in the optical axis direction.

Further, the raised portion 210 is formed along the circumferential direction of the drive frame 200 and protrudes beyond the other flat portions on the outer circumference of the drive frame 200. By forming the raised portion 210, the lens barrel in which the drive frame 200 is incorporated in the fixing frame 100 can suppress the amount of light leakage, compared with the lens barrel not provided with the raised portion 210.

A gap portion 211 is between the raised portion 210 and the cam follower 201. The gap portion 211 is a valley portion formed by the both sides of gap portion 211 being sandwiched by the raised portion 210 and the cam follower 201.

[4. Operations of the Drive Frame and the Fixing Frame]

Figure 17:
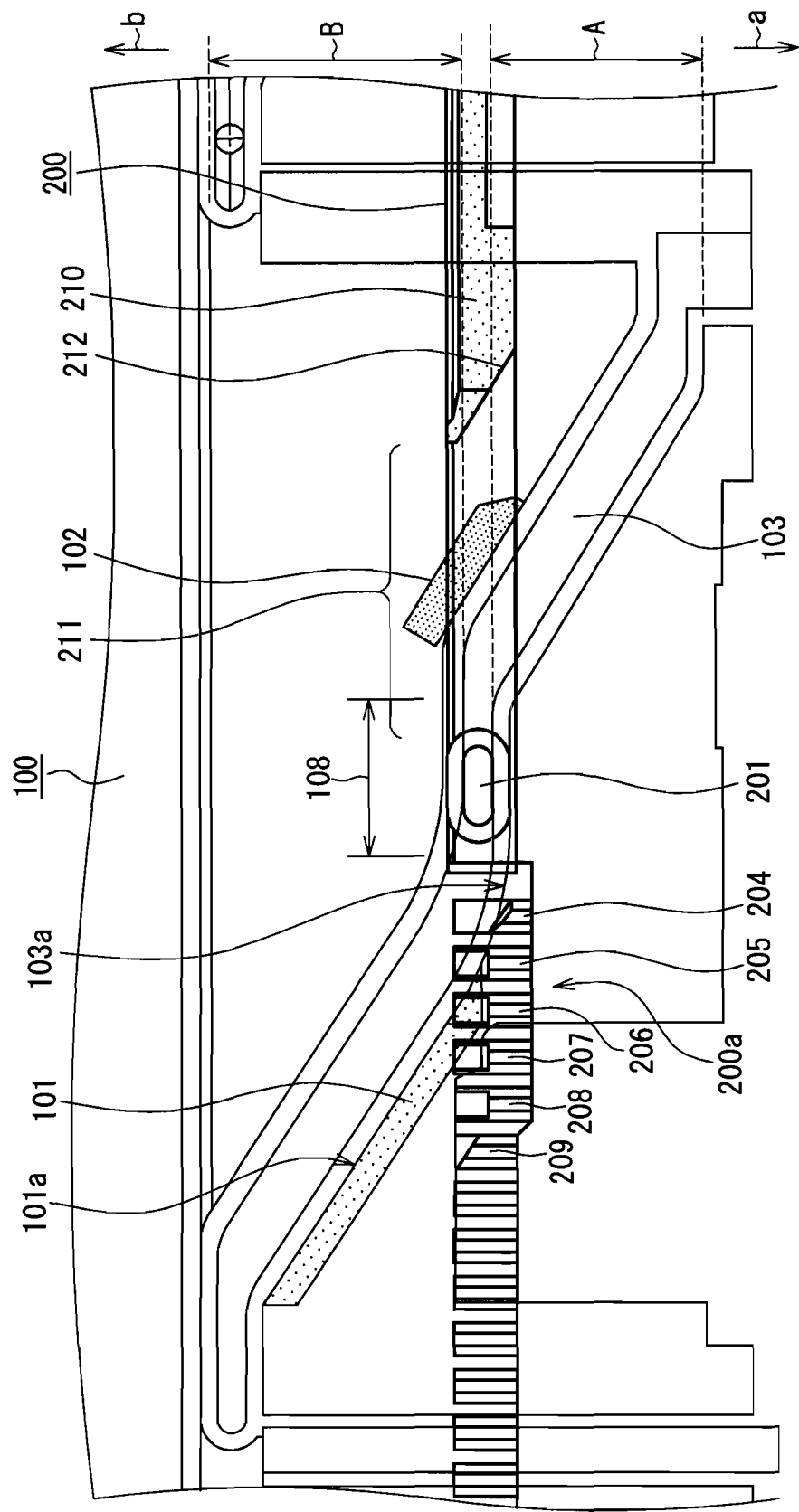
FIG. 17 is a development view showing a configuration of an internal surface of the fixing frame that incorporates the drive frame.
Figure 18:
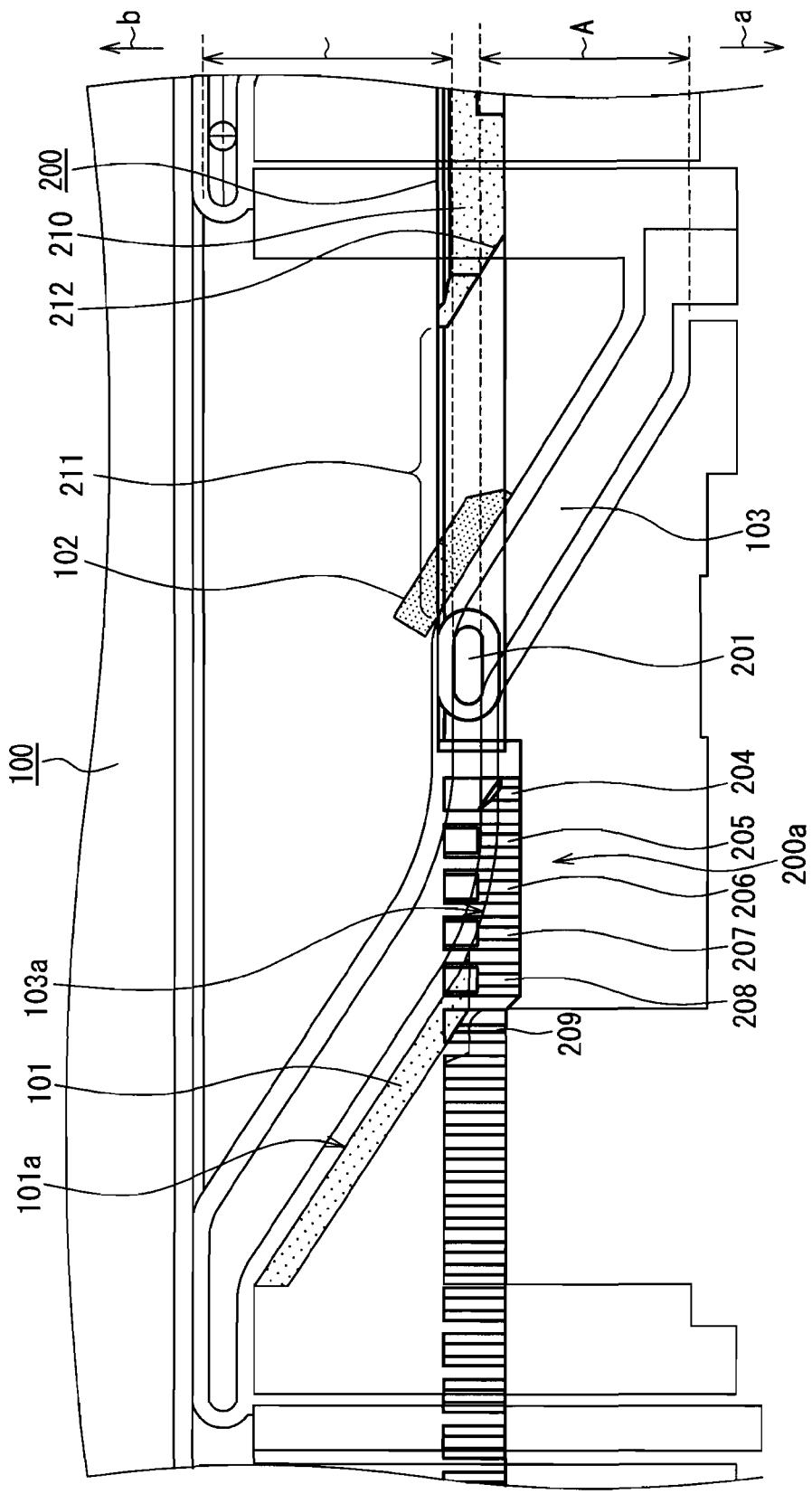
FIG. 18 is a development view showing a configuration of an internal surface of the fixing frame that incorporates the drive frame.
Figure 19:
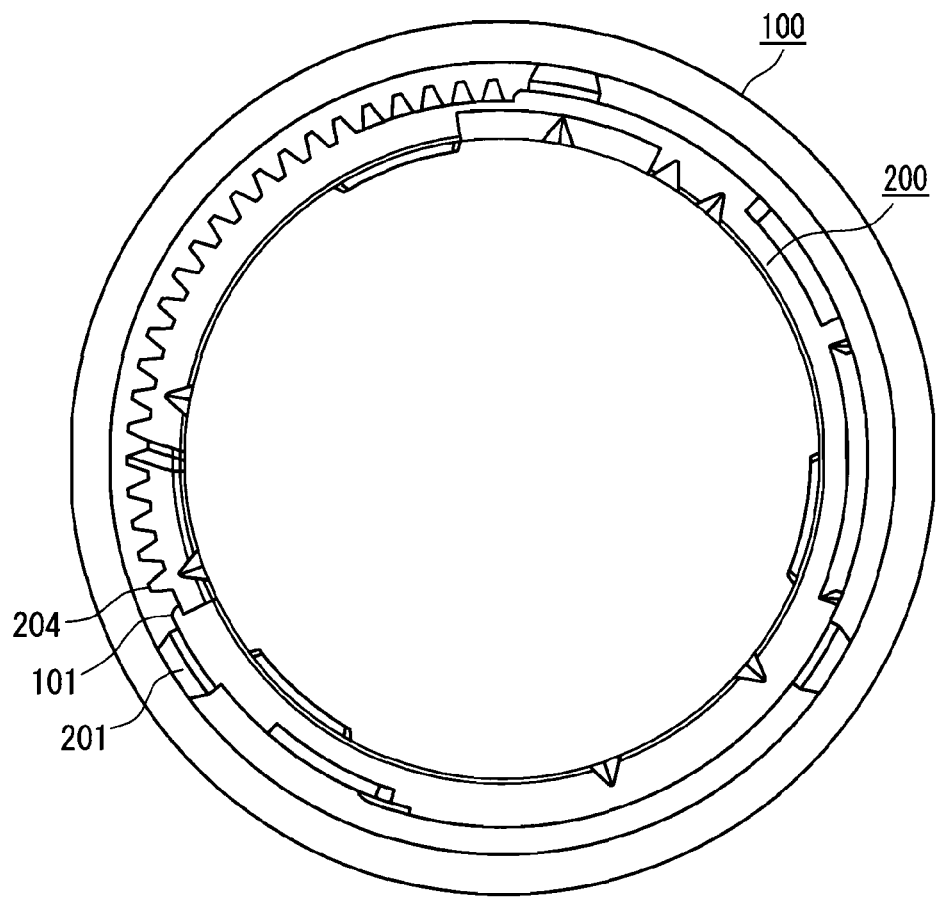
FIG. 19 is a top view of the fixing frame that incorporates the drive frame.
Figure 20A:
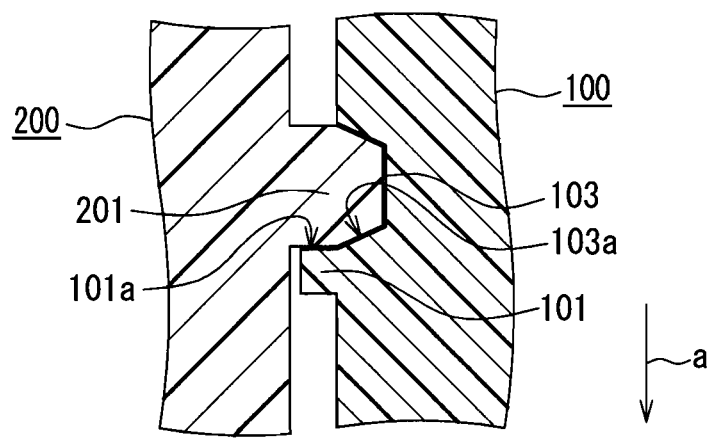
FIG. 20A is a cross-sectional view taken along a line V1-V1 in FIG. 15.
Figure 20B:
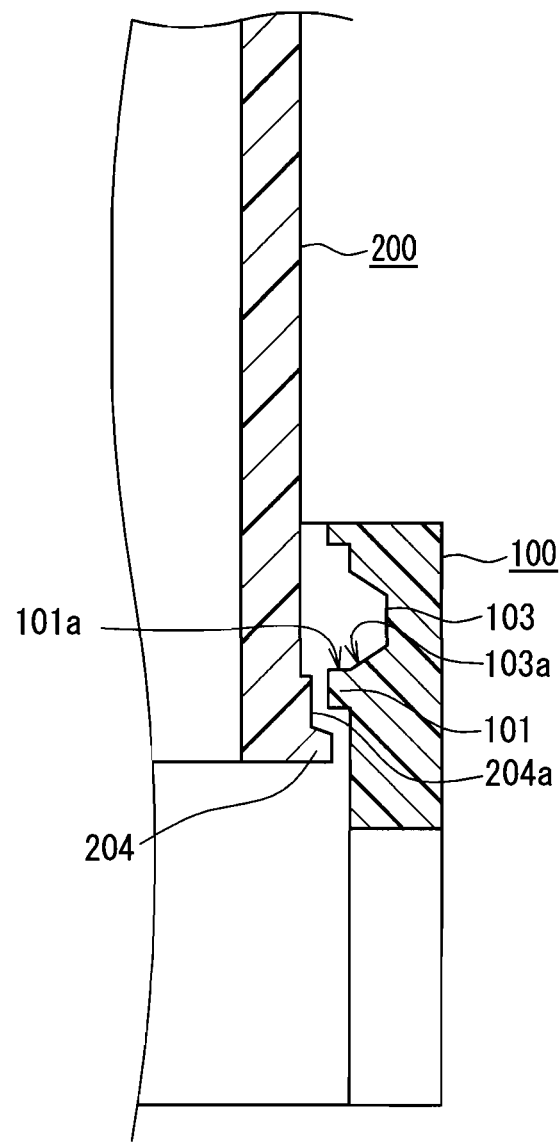
FIG. 20B is a cross-sectional view taken along a line V2-V2 in FIG. 15.

FIGS. 15 to 18 are development views showing internal surfaces of the unit in which the drive frame 200 is incorporated in the predetermined position of the fixing frame 100. FIG. 19 is a schematic diagram of the unit in which the drive frame 200 is incorporated in the predetermined position of the fixing frame 100, seen from the above. FIG. 20A is a cross-sectional view taken along a line V1-V1 in FIG. 15. FIG. 20B is a cross-sectional view taken along a line V2-V2 in FIG. 15. In FIGS. 15 to 18, hatchings are given to illustrate clearly the protrusions 101, 102 and the raised portion 210. Further, in FIGS. 15 to 18, the thin line indicates the fixing frame 100 and the configuration included in the fixing frame 100, and the bold line indicates the drive frame 200 and the configuration included in the drive frame 200.

The fixing frame 100 is formed in a substantially cylindrical shape and is capable of incorporating the drive frame 200 in its internal space. Specifically, the drive frame 200 is held inside the fixing frame 100, with a state in which the cam followers 201, 202 and 203 are fitted in the cam grooves 103, 104 and 105, respectively.

A plurality of the engaging teeth 200a formed on the drive frame 200 are engaged with teeth (not shown) such as a gear that is arranged inside or outside of the lens barrel. By the rotation of the gear that is engaged with the engaging teeth 200a, the drive frame 200 obtains rotational power with respect to the fixing frame 100 via the engaging teeth 200a. On the other hand, the cam grooves 103 to 105 respectively fitted with the cam followers 201 to 203 are formed in the direction wherein power can be decomposed into an optical axis L direction component of the lens held by the drive frame 200 as well as a rotational direction component of the drive frame 200 with respect to the fixing frame 100. Thus, the direction provided with the cam grooves 103 to 105 possesses the rotational direction component of the drive frame 200 to the fixing frame 100, whereby when the drive frame 200 obtains rotational power with respect to the fixing frame 100, the cam followers 201 to 203 move along the cam grooves 103 to 105. In this manner, the drive frame 200 moves along the optical axis L direction of the lens held by itself, because the direction provided with the cam grooves 103 to 105 possesses the optical axis L direction component of the lens held by the drive frame 200.

The moving operation of the drive frame 200 in the optical axis L direction will be described in detail.

Figure 15:
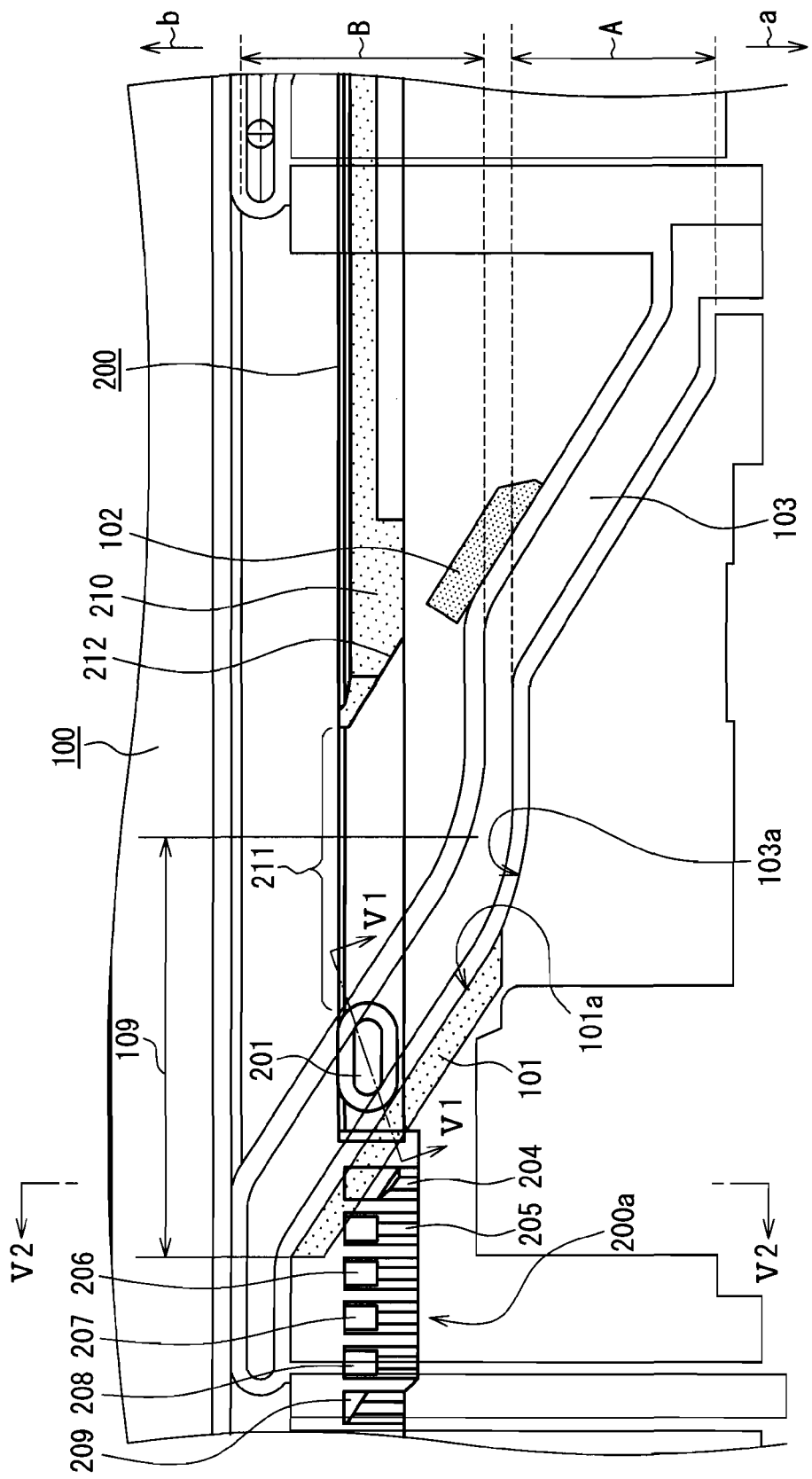
FIG. 15 is a development view showing a configuration of an internal surface of the fixing frame that incorporates the drive frame.

FIG. 15 shows a state in which the cam follower 201 is located in the area of the inclined portion 109 in the cam groove 103. As shown in FIG. 20A, the protrusion 101 forms a wall surface along the cam groove 103. That is, a lateral surface 101a of the protrusion 101 is adjacent to an inner wall surface 103a of the cam groove 103. Thus, in an area where the protrusion 101 is provided, the cam follower 201 comes into contact with both the protrusion 101 and the cam groove 103. On the other hand, in the other areas, the cam follower 201 only comes into contact with the cam groove 103. Therefore, a contact area between the cam follower 201 and the fixing frame 100 in the area where the protrusion 101 is provided is larger than the contact areas therebetween in the other areas. Therefore, even if an external force exceeding the predetermined amount is applied to the lens barrel in the direction indicated by the arrow a at the time the cam follower 201 is located at the position shown in FIG. 15, the lateral surface 101a of the protrusion 101 as well as the inner wall surface 103a of the cam groove 103 receive the force applied to the cam follower 201 in the direction indicated by the arrow a, whereby the cam follower 201 can be prevented from coming out of the cam groove 103.

Here, as shown in FIG. 20B, since the notch 204a is formed on the engaging teeth 204 in the substantially oblique direction, the protrusion 101 and the engaging tooth 204 are not engaged with each other in a state shown in FIG. 15. Further, the protrusion 101 and a plurality of the engaging teeth 200a are not engaged with each other. Thus, in the drive frame 200, the cam follower 201 and the engaging teeth 200a can be disposed at a position closer to each other. Closely disposing the cam follower 201 and the engaging teeth 200a allows the drive frame 200 to have a larger number of the engaging teeth. Increasing the number of the engaging teeth allows the drive frame 200 to secure a larger rotation amount. Thus, the lens barrel according to the present embodiment achieves more precise lens driving.

Incidentally, in the present embodiment, the oblique notch 204a is formed on the engaging tooth 204, as shown in FIG. 14. However, the notch 204a formed on the engaging tooth 204 is not limited to this shape and may have a substantially horizontal shape or the like, such as the notch 205a. In short, the notch on the engaging tooth 204 may be formed in any shape as long as the protrusion 101 and the engaging tooth 204 do not interfere with each other.

As shown in FIG. 15, in a state where the cam follower 201 is located in the area of the inclined portion 109, the protrusion 101 is disposed between the cam follower 201 and the engaging tooth 204 as shown in FIG. 19. Further, the protrusion 101 and the cam follower 201 are spaced apart from each other, and the protrusion 101 and the engaging tooth 204 are spaced apart from each other.

Figure 16:
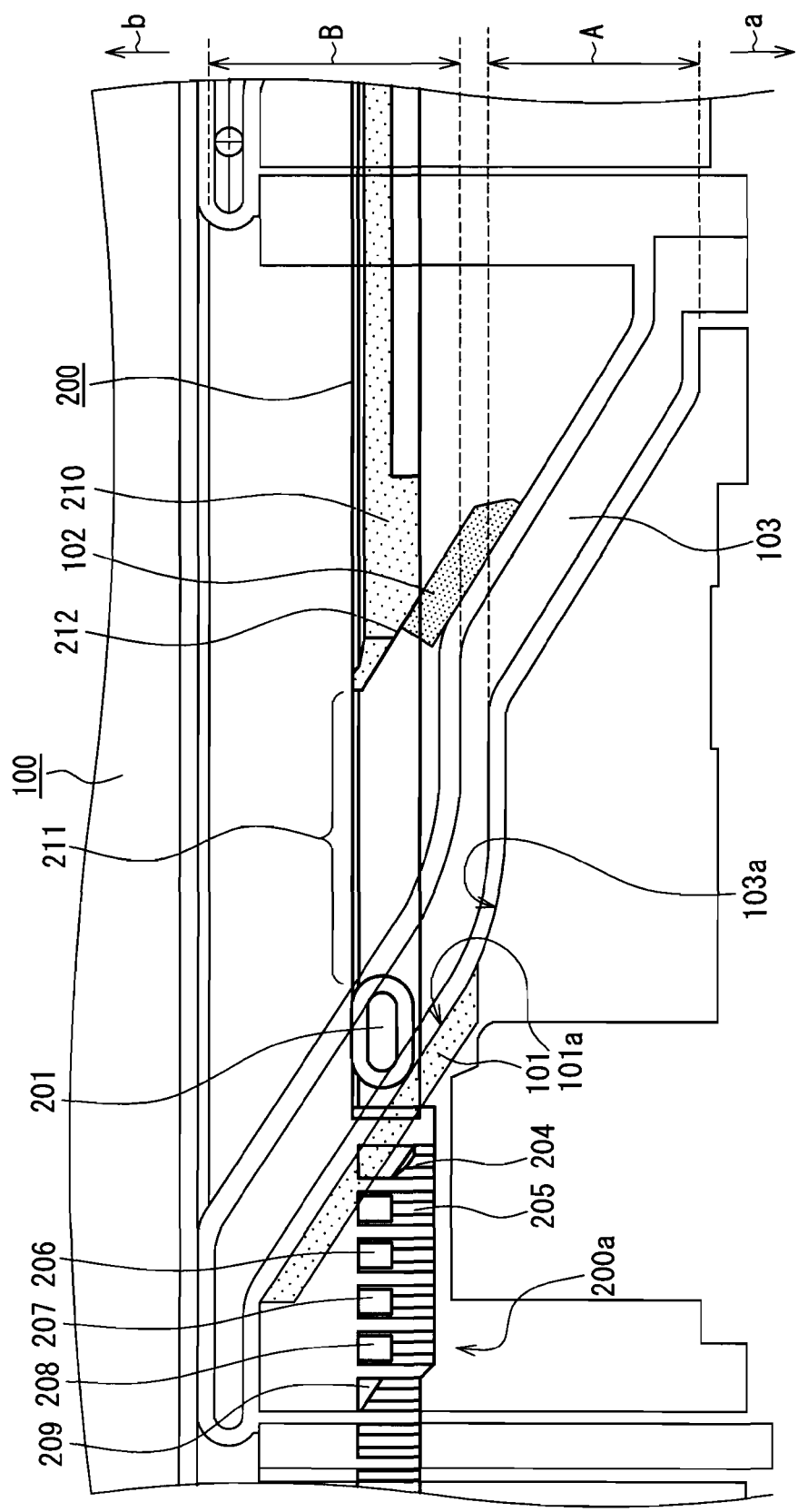
FIG. 16 is a development view showing a configuration of an internal surface of the fixing frame that incorporates the drive frame.

FIG. 16 is a development view of the fixing frame 100 and the drive frame 200, showing a state in which the fixing frame 100 holds the drive frame 200 at a position closer to the wide-angle.

In a state shown in FIG. 16, the protrusion 101 forms a wall surface along the cam groove 103 (see the lateral surface 101a and the inner wall surface 103a in FIG. 20A), as in the state shown in FIG. 15. Therefore, the contact area between the cam follower 201 and the fixing frame 100 in the area where the protrusion 101 is provided is larger than the contact areas therebetween in the other areas. Thus, in the case where an external force exceeding the predetermined amount is applied to the lens barrel in the direction indicated by the arrow a, the protrusion 101 prevents the cam follower 201 from coming out of the cam groove 103.

Further, in the state shown in FIG. 16, the raised portion 210 and the protrusion 102 are disposed at a position very close to each other. However, the raised portion 210 and the protrusion 102 are spaced apart by sandwiching a slight clearance. With this state, when an external force exceeding the predetermined amount is applied to the lens barrel in the direction indicated by the arrow a, the raised portion 210 and the protrusion 102 come into contact with each other. The contact between the raised portion 210 and the protrusion 102 makes it possible to prevent the cam follower 201 from coming out of the cam groove 103.

Incidentally, in the present embodiment, a front end portion 212 of the raised portion 210 and the protrusion 102 come into contact with each other at the time an external force is applied to the drive frame 200. However, the present invention is not limited to this configuration. It is only necessary that the end portion of the drive frame 200 and the protrusion 102 are brought into contact with each other at the time an external force exceeding the predetermined amount is applied to the drive frame 200.

Further, in the present embodiment, the front end portion 212 of the raised portion 210 is notched parallel to the moving direction of the cam follower 201 in the inclined portion 107. Because of this, the raised portion 210 can be made fully large within an area in which the front end portion 212 of the raised portion 210 and the protrusion 102 are spaced apart from each other. The enlarged raised portion 210 makes it possible to reduce the amount of light leakage from the lens barrel.

In the state shown in FIG. 16, the protrusion 101 is disposed between the cam follower 201 and the engaging tooth 204 as shown in FIG. 19. Further, in the state shown in FIG. 16, the protrusion 101 and the cam follower 201 are spaced apart from each other, and the protrusion 101 and the engaging tooth 204 are spaced apart from each other.

Here, when the cam follower of the drive frame 200 is located within a region A, the digital camera is in a non-photographing state. On the other hand, when the cam follower of the drive frame 200 is located within a region B, the digital camera is in a photographing state. In the present embodiment, the protrusion 101 is formed so that when the drive frame 200 is located between the telephoto position and the wide-angle position (i.e. the digital camera photographing position), the protrusion 101 is close to the position where the cam follower 201 is present. Further, the protrusion 102 is formed so that when the drive frame 200 is located at the wide-angle position, the protrusion 102 is close to the position where the end portion of the raised portion 210 (end portion of the fixing frame 100 in the circumferential direction) is present.

As shown in FIGS. 15 and 16, in the lens barrel according to the present embodiment, the protrusion 101 is formed along an area where the cam follower 201 moves at the time the digital camera can photograph a subject. That is, the protrusion 101 is formed along an area where the cam follower 201 moves during the movement of the lens (not shown) between the telephoto end and the wide-angle end. However, the protrusion 101 is not formed along an area where the cam follower 201 moves at the time the digital camera cannot photograph a subject.

Further, the protrusion 102 is formed along an area where the raised portion 210 moves at the time the photographing at the wide-angle position is possible. However, the protrusion 102 is not formed along an area where the raised portion 210 moves at the time the digital camera photographing is impossible. The reason why the protrusions 101 and 102 have the above-described configurations will be described below.

Here, consideration is given to the case where the user mistakenly drops the digital camera on the floor or the like in the lens received state (digital camera non-photographing state) and an external force is applied to the lens barrel of the digital camera in the direction indicated by the arrow a. When the drive frame 200 is received perfectly within the fixing frame 100, the cam follower 201 is located at the end of the cam groove 103 in the direction indicated by the arrow a. An imaging element and the like of the digital camera body are present beyond the end of the cam groove 103 in the direction indicated by the arrow a. Therefore, in the case where the cam follower 201 is located at the end of the cam groove 103 in the direction indicated by the arrow a, and if an external force is applied to the lens barrel in the direction indicated by the arrow a, the imaging element and the like of the digital camera body present further on the side indicated by the arrow a from the position of the cam follower 201 serve as a wall, whereby the cam follower 201 does not come out of the cam groove 103.

On the other hand, in the photographing state, the cam follower 201 is present within the region B of the cam groove 103. In this case, there is a space where the cam follower 201 may be found, further on the side indicated by the arrow a from the position of the cam follower 201. Therefore, when an external force is applied to the lens barrel in the direction indicated by the arrow a, the cam follower 201 may come out of the cam groove 103.

Therefore, in the present embodiment, in order to prevent the cam follower 201 from coming out of the cam groove 103, the protrusions 101 and 102 are provided in areas where the cam follower 201 may come out of the cam groove 103.

The raised portion 210 and the cam follower 201 protrude beyond the gap portion 211 in the outer circumference of the drive frame 200. Therefore, in the state where the fixing frame 100 incorporates the drive frame 200, a space is formed between the inner circumferential surface of the fixing frame 100 and the gap portion 211. The space formed between the gap portion 211 and the inner circumferential surface of the fixing frame 100 passes over the protrusion 102 along with the movement of the cam follower 201 in the cam groove 103. This means that even if the protrusion 102 is provided on the inner circumferential surface of the fixing frame 100, the drive frame 200 does not come into contact with the protrusion 102 while moving with respect to the fixing frame 100. Therefore, the protrusion 102 does not prevent the movement of the drive frame 200.

FIG. 17 shows a state in which the fixing frame 100 holds the drive frame 200 at a position closer to the wide-angle. FIG. 18 shows a state in which the fixing frame 100 holds the drive frame 200 at the digital camera non-photographing position.

In the state shown in FIGS. 17 and 18, the protrusion 101 is not engaged with a plurality of engaging teeth, such as the engaging tooth 206 and the engaging tooth 207. This is because, as shown in FIG. 12B, the notches 206a, 207a, 208a and 209a are formed on the engaging teeth 206, 207, 208 and 209, respectively.

Further, the notches 204a and 209a that are formed in the substantially oblique direction and the notches 205a, 206a, 207a and 208a that are formed in the substantially horizontal direction are formed continuously. Therefore, the protrusion 101 and a plurality of the engaging teeth are spaced apart from each other when the cam follower 201 of the drive frame 200 moves along the cam groove with a complicated configuration such as the cam groove 103. Therefore, the protrusion 101 does not prevent the movement of the drive frame 200.

As shown in FIG. 17, in the wide-angle position (horizontal portion 108), the protrusion for supporting the cam follower 201 is not provided along the cam groove 103. This is because, originally, the cam follower 201 is less likely to come out of the cam groove 103 in a state where the cam follower 201 is located in the horizontal portion 108 of the cam groove 103. However, the present invention is not limited to this configuration, and protrusions for supporting the cam follower 201 may be provided along the cam groove 103, also in the wide-angle position.

Further, the space formed between the gap portion 211 and the inner circumferential surface of the fixing frame 100 passes over the protrusion 102 along with the movement of the cam follower 201 in the cam groove 103. When the drive frame 200 moves farther in the direction indicated by the arrow a from the state shown in FIG. 18, the space between the gap portion 211 and the inner circumferential surface of the fixing frame 100 perfectly passes over the protrusion 102.

[Example of Another Configuration]

As described above, Embodiment 1 and Embodiment 2 are illustrated as embodiments of the present invention. However, the present invention is not limited to these embodiments. Here, another embodiment of the present invention will be summarized below.

The fixing frames and the drive frames constituting the lens barrels according to Embodiment 1 and Embodiment 2 are not limited to the lens barrels shown in FIGS. 1 to 19. For example, in the lens barrels shown in FIGS. 1 to 19, the fixing frame 100 provided with three cam grooves 103 to 105 is illustrated, but it may include the number of the cam grooves other than three.

Further, in the lens barrels shown in FIGS. 1 to 19, the fixing frame 100 provided with the cam grooves 103 to 105, all of which are composed of the horizontal portion 106, the inclined portion 107, the horizontal portion 108 and the inclined portion 109, is illustrated. However, the fixing frame may be provided with cam grooves with other shapes, such as a cam groove simply composed of the inclined portion.

Further, in the lens barrels shown in FIGS. 1 to 19, the drive frame 200 provided with the three cam followers 201 to 203 is illustrated, but it may include the number of the cam followers other than three as long as the number of the cam follower is the same as that of the cam grooves in the fixing frame 100.

Further, in the lens barrel according the Embodiment 2, the fixing frame 100 in which the protrusions 101 and 102 are formed only in the vicinity of the cam groove 103 is illustrated, but the present invention is not limited to this configuration. For example, the fixing frame may include protrusions along a plurality of cam grooves, such as by providing the protrusions 101 and 102 also for the cam grooves 104 and 105.

Further, in the lens barrel according to Embodiment 2, the fixing frame 100 provided with the protrusions 101 and 102 along the cam groove 103 is illustrated, but it does not necessarily include both the protrusions 101 and 102, and may include either one of them.

Figure 21:
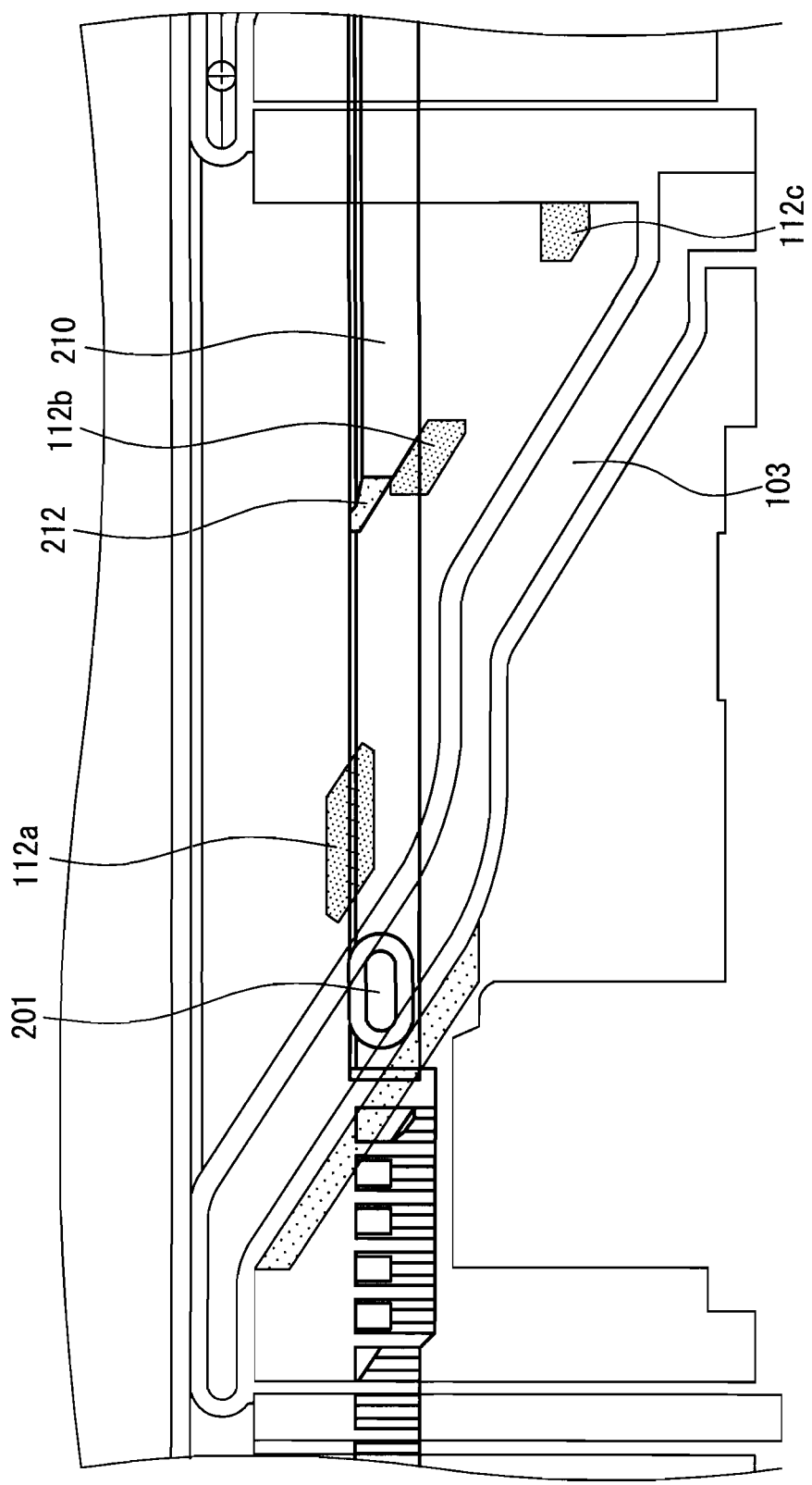
FIG. 21 is a development view showing another exemplary configuration of the fixing frame and the drive frame.

Incidentally, in Embodiment 2, the protrusion 102 is formed along the cam groove 103. However, the present invention is not limited to this configuration, and as shown in FIG. 21, the protrusions 112a, 112b and 112c may be formed in an area distant from the cam groove 103. In short, it is only necessary that, among a plurality of the cam grooves provided in the fixing frame 100, protrusions be provided in at least two adjacent regions of the cam grooves.

Figure 22:
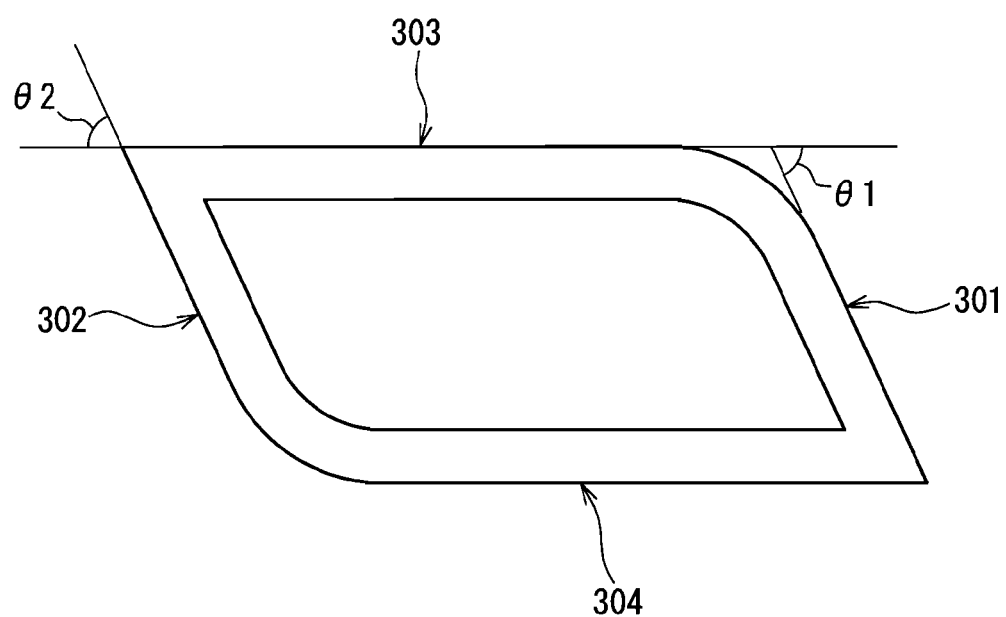
FIG. 22 is a plan view showing another exemplary configuration of the cam follower.
Figure 23:
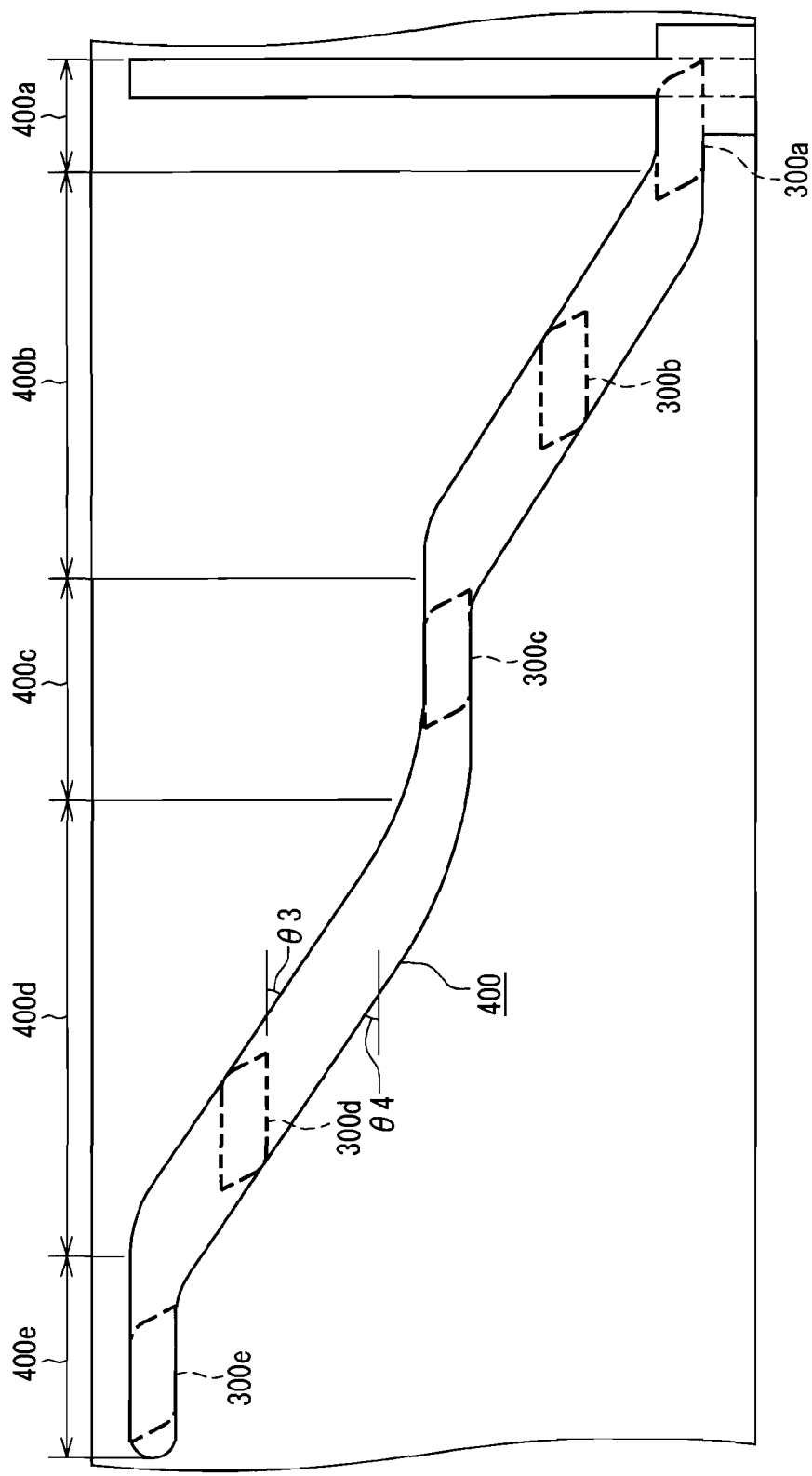
FIG. 23 is a schematic diagram showing a configuration of an inner surface of the fixing frame.

Further, the cam follower 22 according to Embodiment 1 and the cam followers 201, 202 and 203 according to Embodiment 2 have a substantially oval shape, but the present invention is not limited to this shape as long as it can be fitted movably in the cam groove. FIG. 22 is a plan view showing another exemplary configuration of the cam follower. A plane of the cam follower shown in FIG. 22 has a substantially parallelogram shape and two opposing obtuse angles have an arc shape. A lateral surface 301 and a lateral surface 302 are substantially in parallel to one another. A lateral surface 303 and a lateral surface 304 are substantially in parallel to one another. An angle θ1 formed by the lateral surfaces 301 and 303 as well as an angle θ2 formed by the lateral surfaces 302 and 304 are substantially the same angle, which are less than 90°. FIG. 23 is a schematic diagram showing a cam groove, with the cam follower shown in FIG. 22 fitted therein. An angle θ3 and an angle θ4 shown in FIG. 23 are angles of a cam groove 400 in a region 400d. The angle θ1 is the same or larger than the angle θ3, and the angle θ2 is the same or larger than the angle θ4.

As shown in FIG. 23, when a cam follower 300 is located in a region 400a (for example, at the position indicated by a dashed line 300a), the lateral surfaces 303 and 304 are in contact with the inner wall of the cam groove 400. When the cam follower 300 is located in a region 400b (for example, at the position indicated by a dashed line 300b), a part of the lateral surface 301 and a part of the lateral surface 302 are in contact with the inner wall of the cam groove 400. When the cam follower 300 is located in a region 400c (for example, at the position indicated by a dashed line 300c), the lateral surfaces 303 and 304 are in contact with the inner wall of the cam groove 400. When the cam follower 300 is located in a region 400d (for example, at the position indicated by a dashed line 300d), a part of the lateral surface 301 and a part of the lateral surface 302 are in contact with the inner wall of the cam groove 400. When the cam follower 300 is located in a region 400e (for example, at the position indicated by a dashed line 300e), the lateral surfaces 303 and 304 are in contact with the inner wall of the cam groove 400.

Thus, by forming the cam follower 300 in the shape shown in FIG. 22, a contact area between the cam follower 300 and the inner wall of the cam groove 400 at the time the cam follower 300 is located in the region 400b or 400d is increased, compared with the cam follower in the substantially oval shape.

In other words, when the cam follower in the substantially oval shape is located in the region 400b or 400d shown in FIG. 23, the contact area between the cam follower and the inner wall of the cam groove 400 is small, whereby the contact pressure is concentrated. Because of this, the inner wall of the cam groove may be shaved down during the movement of the cam follower within the cam groove. Further, a portion of the cam follower in contact with the inner wall of the cam groove may be worn out. Furthermore, when an accumulated moving distance of the cam follower becomes long, the inner wall of the cam groove or the cam follower may be shaved greatly, which may result in looseness between the cam follower and the cam groove.

To cope with this, by forming the cam follower in the shape shown in FIG. 22, the contact area between the cam follower and the inner wall of the cam groove 400 at the time the cam follower is located in the region 400b or 400d shown in FIG. 23 is increased, whereby the contact pressure applied to the inner wall of the cam groove 400 or the cam follower can be dispersed. Thus, it is possible to reduce the possibility of the inner wall of the cam groove being shaved down by the cam follower and the cam follower being worn out. Therefore, the looseness between the cam follower and the cam groove can be suppressed.

Further, by forming the cam follower in the shape shown in FIG. 22, the cross section of the cam follower is increased, whereby the rigidity of the cam follower can be increased.

Incidentally, the fixing frame 10 is an example of the fixing frame in the present invention. The drive frame 20 is an example of the drive frame in the present invention. The first region 12a, the third region 12c and the fifth region 12e in the cam groove 12 are an example of the first region in the present invention. The second region 12b and the fourth region 12d in the cam groove 12 are an example of the second region in the present invention. Moreover, the rectilinear frame 30 is an example of the rectilinear frame in the present invention. The rectilinear key 32 is an example of the protruded portion in the present invention. The raised portion 210 is an example of the raised portion in the present invention. The protrusion 101 is an example of the first protrusion in the present embodiment. The protrusion 102 is an example of the second protrusion in the present invention.

INDUSTRIAL APPLICABILITY

The present invention is useful as a lens barrel mounted in the imaging apparatus such as a digital camera, a video camera, a silver halide cameras and a mobile telephone terminal with an image pickup device.

The invention claimed is:

1. A lens barrel, comprising:
a first frame formed in a substantially cylindrical shape that has at least one cam groove; and
a second frame formed in a substantially cylindrical shape that has at least one cam follower to be engaged with the cam groove,
wherein when the second frame rotates relative to the first frame, the second frame moves relative to the first frame in an optical axis direction,
the cam follower has a first lateral surface and a second lateral surface,
the first lateral surface is part of a cone or cylinder that is formed around a first center,
the second lateral surface is part of a cone or cylinder that is formed around a second center,
the first center and the second center are aligned in a circumferential direction of the second frame,
the cam groove has a parallel portion that is substantially parallel to a circumferential direction of the first frame, an inclined portion that is inclined with respect to the circumferential direction of the first frame, and a curved portion that joins the parallel portion and the inclined portion,
the inclined portion is configured so that, when the second frame rotates in one direction, the cam follower moves in only one direction along the optical axis direction, and
the inclined portion and the curved portion of the cam groove are formed so that, lateral surfaces thereof are engaged with the first lateral surface and the second lateral surface of the cam follower substantially continuously.

2. The lens barrel according to claim 1, wherein a groove width of the inclined portion is larger than that of the parallel portion.

3. The lens barrel according to claim 2, wherein a groove width of the curved portion is gradually increased from the parallel portion toward the inclined portion.

4. The lens barrel according to claim 3, wherein a diameter of the cone or cylinder formed around the first center is substantially the same as that of the cone or cylinder formed around the second center.

5. The lens barrel according to claim 4,
wherein the parallel portion has a first parallel portion and a second parallel portion, and
the inclined portion is arranged between the first parallel portion and the second parallel portion.

6. The lens barrel according to claim 5,
wherein when the cam follower is located in the first parallel portion, a focal length of a optical system of the lens barrel is at a telephoto end,
when the cam follower is located in the second parallel portion, the focal length is at a wide-angle end, and
when the cam follower is located in the inclined portion, the focal length is in a transition section between the telephoto end and the wide-angle end.

7. The lens barrel according to claim 5,
wherein when the cam follower is located in the first parallel portion, a focal length of an optical system of the lens barrel is between a wide-angle end and a telephoto end,
when the cam follower is located in the second parallel portion, the lens barrel is in a collapsed state, and
when the cam follower is located in the inclined portion, the lens barrel is in a transition section between the wide-angle end and the collapsed state.

8. The lens barrel according to claim 5,
wherein the parallel portion further has a third parallel portion,
the inclined portion has a first inclined portion and a second inclined portion,
the parallel portion is composed of the first parallel portion, the second parallel portion and the third parallel portion in this order in the optical axis direction from a subject side,
the first inclined portion is arranged between the first parallel portion and the second parallel portion, and
the second inclined portion is arranged between the second parallel portion and the third parallel portion.

9. The lens barrel according to claim 8,
wherein when the cam follower is located in the first parallel portion, a focal length of a optical system of the lens barrel is at a telephoto end,
when the cam follower is located in the second parallel portion, the focal length is at a wide-angle end,
when the cam follower is located in the third parallel portion, the lens barrel is in a collapsed state,
when the cam follower is located in the first inclined portion, the focal length of the optical system is in a transition section between the telephoto end and the wide-angle end, and
when the cam follower is located in the second inclined portion, the lens barrel is in a transition section between the wide-angle end and the collapsed state.

10. The lens barrel according to claim 8, wherein the inclined portion is configured so that, in the first inclined portion, the cam follower moves relative to one direction of the optical axis direction when the second frame rotates in one direction, and in the second inclined portion, the cam follower moves relative to the other direction of the optical axis direction when the second frame rotates in one direction.

11. The lens barrel according to claim 8, wherein the inclined portion is a region where a relationship between the rotation of the second frame and an amount of movement of the cam follower in the optical axis direction is substantially linear.

12. The lens barrel according to claim 8, wherein the inclined portion includes a region where a relationship between the rotation of the second frame and an amount of movement of the cam follower in the optical axis direction is nonlinear.

13. The lens barrel according to claim 4, wherein the inclined portion is a region where a relationship between the rotation of the second frame and an amount of movement of the cam follower in the optical axis direction is substantially linear.

14. The lens barrel according to claim 4, wherein the inclined portion includes a region where a relationship between the rotation of the second frame and an amount of movement of the cam follower in the optical axis direction is nonlinear.

* * * * *